United States Patent
Godunov

(10) Patent No.: US 11,699,420 B2
(45) Date of Patent: *Jul. 11, 2023

(54) MUSIC COMPOSITION AID

(71) Applicant: Limitless Music, LLC, Laurel, MD (US)

(72) Inventor: Vladimir Godunov, Laurel, MD (US)

(73) Assignee: Limitless Music, LLC, Laurel, MD (US)

(*) Notice: Subject to any disclaimer, the term of this patent is extended or adjusted under 35 U.S.C. 154(b) by 152 days.

This patent is subject to a terminal disclaimer.

(21) Appl. No.: 17/113,520

(22) Filed: Dec. 7, 2020

(65) Prior Publication Data

US 2021/0090537 A1    Mar. 25, 2021

Related U.S. Application Data

(63) Continuation of application No. 16/457,361, filed on Jun. 28, 2019, now Pat. No. 10,861,429.

(Continued)

(51) Int. Cl.
*G10H 1/00* (2006.01)
*G06F 16/68* (2019.01)
(Continued)

(52) U.S. Cl.
CPC ......... *G10H 1/0066* (2013.01); *G06F 16/683* (2019.01); *G06F 16/686* (2019.01); *G10H 1/40* (2013.01); *G10H 2220/116* (2013.01)

(58) Field of Classification Search
CPC .. G10H 1/0066; G10H 1/40; G10H 2220/116; G10H 2220/126;
(Continued)

(56) References Cited

U.S. PATENT DOCUMENTS

| | | | |
|---|---|---|---|
| 2008/0092721 A1* | 4/2008 | Schnepel | G10H 1/0025 84/609 |
| 2009/0071315 A1* | 3/2009 | Fortuna | G10H 1/0025 84/609 |

(Continued)

OTHER PUBLICATIONS

International Search Report and Written Opinion of the International Searching Authority directed to related International Patent Application No. PCT/US2019/039886, dated Sep. 20, 2019; 9 pages.

*Primary Examiner* — Jeffrey Donels
(74) *Attorney, Agent, or Firm* — Sterne, Kessler, Goldstein & Fox P.L.L.C.

(57) ABSTRACT

Disclosed herein are computer-implemented method, computer-readable storage medium, and DAW embodiments for implementing a music composition aid. An embodiment includes retrieving a first constraint value, receiving a selection of a set of musical elements, and accepting a second constraint value corresponding to the set of musical elements. Some embodiments further include invoking an iterator function, using at least the second constraint value as an argument, and generating an output of the iterator function, limiting a size of the output of the iterator function, according to the lesser of the first constraint value or a transform of the second constraint value. Output of the iterator function may include, of the set of musical elements, a subset determined by the second constraint value. The size of the output may be no more than the first constraint value. Further embodiments may render the output of the iterator function visually and/or audibly, for example.

3 Claims, 39 Drawing Sheets

Related U.S. Application Data

(60) Provisional application No. 62/692,402, filed on Jun. 29, 2018.

(51) Int. Cl.
*G10H 1/40* (2006.01)
*G06F 16/683* (2019.01)

(58) Field of Classification Search
CPC ....... G10H 2220/106; G10H 2210/571; G10H 2210/361; G10H 1/0025; G06F 16/686; G06F 16/683
See application file for complete search history.

(56) References Cited

U.S. PATENT DOCUMENTS

| | | |
|---|---|---|
| 2012/0180619 A1 | 7/2012 | Adam et al. |
| 2014/0208922 A1 | 7/2014 | Adnitt et al. |
| 2018/0174559 A1 | 6/2018 | Elson |

\* cited by examiner

500

┌─ Rhythm Length ─────────────────────────────────┐
│ 16                                            ∨ │
└─────────────────────────────────────────────────┘

FIG. 5

Shift Rhythm
| Left (-) | Right (+) | Add To Favorites |

FIG. 6

```
Permutations
1 1 1 1 1 1 3 2 2 1 1 1
1 1 1 1 1 1 3 2 1 2 1 1
1 1 1 1 1 1 3 2 1 1 2 1
1 1 1 1 1 1 3 2 1 1 1 2
1 1 1 1 1 1 3 1 2 2 1 1
1 1 1 1 1 1 3 1 2 1 2 1
1 1 1 1 1 1 3 1 2 1 1 2
1 1 1 1 1 1 3 1 1 2 2 1
1 1 1 1 1 1 3 1 1 2 1 2
1 1 1 1 1 1 3 1 1 1 2 2
```
Next Batch: 1/479002

FIG. 7

Favorite Rhythms:
```
11122233
1112334
111336
1113333
111345
1222233
122334
12345
222234
222333
```

Delete From Favorites

FIG. 9

| Rhythm | | Melody | | Chords | | Exports | |
|---|---|---|---|---|---|---|---|
| Search by Mood Descriptor... | | < | > | Play Favorite | | Export Favorite | |

| Rhythm | Best Length | Note Duration | Mood Descriptor | Rating |
|---|---|---|---|---|
| ▫▫▫▫▫▫ | 8 | 16th Triplet | default | ♪♪ > |
| ▫▫▫▫▫▫▫▫▫▫▫▫▫▫▫▫ | 16 | 16th Triplet | cool | ♪♪♪ > |
| ▫▫▫▫▫▫▫▫▫▫▫▫ | 16 | 16th Triplet | default | ♪♪ > |
| ▫▫▫▫▫▫▫▫▫▫▫▫▫ | 16 | 16th Triplet | default | ♪♪♪♪ > |
| ▫▫▫▫▫ | 5 | Dotted 32nd | default | ♪ |

FIG. 10

Chord Type
Triads

FIG. 15

Number Of Melody Notes
2

FIG. 16

Type of Melody Notes
Consonant

FIG. 17

Combinations Length
8

FIG. 18

Midi Instruments
Acoustic Grand Piano

FIG. 19

Chords and Melody Notes

| | |
|---|---|
| 0 1 2 | 0 1 2 3 9 |
| 0 1 3 | 0 1 2 4 9 |
| 0 1 4 | 0 1 2 5 9 |
| 0 1 5 | 0 1 2 6 9 |
| 0 1 6 | 0 1 2 7 9 |
| 0 1 7 | 0 1 2 8 9 |
| 0 1 8 | 0 1 2 9 10 |
| 0 1 9 | 0 1 2 9 11 |
| 0 1 10 | 0 1 3 4 9 |
| 0 1 11 | 0 1 3 9 10 |

| Play Chord | Add To Favorites | Play Melody Notes | Add To Favorites |

| Permutation Rhythms | Combination Rhythms | Next Batch: 1/41 | Play Perm. | Play Comb. | 16th |

FIG. 22

Favorite Chords and Melody Notes

```
6 7 10            0 1 2 6 9              9 6 6 6 6 5 5 2 0
                  2 0 3                  0 0 5 0 8 8 5 1
                  9 7 0 4 1              0 0 5 0 8 8 1 8
                  4 6 1 0                1 1 1 5 1 8 5 1
                  0 1 2 4 5
                  0 1 5 6 9
                  0 1 2 4 5 6 7
```

| Play | Delete Chord | Play | Delete Melody Notes | Play | Delete Melody Note Combinations |

Chord Types I & II
| Triads ⌄ | Pentads ⌄ |
| Tetrads ⌄ | Triads ⌄ |

FIG. 29

| 9 10 11 | (8,9, 11) | (8,9, 10, 11) | 7 8 9 10 11 | (6,7, 8, 10, 11) | (9,10, 11) |
| 8 10 11 | (8,9, 11) | (7,9, 10, 11) | 6 8 9 10 11 | (6,7, 8, 10, 11) | (9,10, 11) |
| 8 9 11 | (8,9, 11) | (7,8, 10, 11) | 6 7 9 10 11 | (6,7, 8, 10, 11) | (8, 9, 11) |
| 8 9 10 | (8,9, 11) | (7,8, 9, 11) | 6 7 8 10 11 | (6,7, 8, 10, 11) | (8, 9, 10) |
| 7 10 11 | (8,9, 11) | (7,8, 9, 10) | 6 7 8 9 11 | (6,7, 8, 10, 11) | (7, 10, 11) |
| 7 9 11 | (8,9, 11) | (6,9, 10, 11) | 6 7 8 9 10 | (6,7, 8, 10, 11) | (7, 9, 11) |
| 7 9 10 | (8,9, 11) | (6,8, 10, 11) | 5 8 9 10 11 | (6,7, 8, 10, 11) | (7, 9, 10) |
| 7 8 11 | (8,9, 11) | (6,8, 9, 11) | 5 7 9 10 11 | (6,7, 8, 10, 11) | (7, 8, 11) |
| 7 8 10 | (8,9, 11) | (6,8, 9, 10) | 5 7 8 10 11 | (6,7, 8, 10, 11) | (7, 8, 10) |
| 7 8 9 | (8,9, 11) | (6,7, 10, 11) | 5 7 8 9 11 | (6,7, 8, 10, 11) | (7, 8, 9) |

Chord Parings I & II

| Play First Chord | Play First Pairing | Play Second Chord | Play Second Pairing |
| Add To Favorites | Add To Favorites | Add To Favorites | Add To Favorites |
| Combine Pairings ||||

FIG. 30

| 4 4 4 4 | 7 4 3 2 | 0 0 0 0 0 0 2 3 4 1 |
| 3 4 4 5 | 7 4 2 3 | 0 0 0 0 0 2 3 4 2 |
| 3 3 5 5 | 7 3 4 2 | 0 0 0 0 2 3 4 3 |
| 3 3 4 6 | 7 3 2 4 | 0 0 0 2 3 4 4 |
| 3 3 3 7 | 7 2 4 3 | 0 0 2 3 4 5 |
| 2 4 5 5 | 7 2 3 4 | 0 2 3 4 6 |
| 2 4 4 6 | 4 7 3 2 | 2 3 4 7 |
| 2 3 5 6 | 4 7 2 3 | 0 3 4 7 1 |
| 2 3 4 7 | 4 3 7 2 | 3 4 7 2 |
| 2 3 3 8 | 4 3 2 7 | 0 0 4 7 2 1 |

| Permutation Rhythms | Combination Rhythms | Next Batch: 1/1 | Play Perm. | Play Comb. | 16th |

FIG. 32

| Rhythm | | | Melody | | | Chords | | | Exports | |
|---|---|---|---|---|---|---|---|---|---|---|
| Search by Mood Descriptor... | | | < | > | Play | Export | | Chord | | v |
| Chord | Chord II | Pairing I | Pairing II | Chord Progression | Permutation/Co... | Rhythm | Note Duration | Mood Descriptor | Rating |
| C C#... | C C#/Db... | | C C#/Db D D#/Eb F | | □ □... | 16th Tri... | sad happy tired | ♩ | v |
| C C#... | C C#/Db... | | C C#/Db C#/Db D C C C | | □ □... | 16th Tri... | default | ♩ | v |
| C C#... | C C#/Db... | | F#/Gb D#/Eb C E C#/Db | | □□... | 16th Tri... | cool | ♫ | v |
| C C#... | C C#/Db... | | C C#/Db C#/Db C#/Db... | | □□... | 16th Tri... | default | ♫ | v |
| C C#... | C C#/Db... | | | | | 16th Tri... | default | | X |

| Rhythm | Melody | Chords | Exports | | |
|---|---|---|---|---|---|
| ▼ ☐ Exports | | | | | |
| 🗋 4ch.mid | | | 106 bytes | 29 Jul 18 15:50 |
| 🗋 4ch2.mid | | | 106 bytes | 29 Jul 18 15:50 |
| 🗋 4ch3.mid | | | 106 bytes | 29 Jul 18 19:04 |
| 🗋 cc1.mid | | | 186 bytes | 29 Jul 18 20:06 |
| 🗋 cc2.mid | | | 186 bytes | 29 Jul 18 20:07 |
| 🗋 ccr1.mid | | | 250 bytes | 29 Jul 18 20:22 |
| 🗋 ccr2.mid | | | 250 bytes | 29 Jul 18 20:23 |

MUSIC COMPOSITION AID

CROSS-REFERENCE TO RELATED APPLICATIONS

The present application is a continuation of U.S. patent application Ser. No. 16/457,361, filed Jun. 28, 2019, which claims the benefit of U.S. Provisional Patent Application No. 62/692,402, filed Jun. 29, 2018. These applications are incorporated herein by reference in their entireties, for all purposes.

BACKGROUND

Whether doing MIDI composition or traditional music notation, many composers may start with a blank page. Some may use a step sequencer and manually click in rhythm ideas, while others may use stamping tools to generate a single chord or scale. Some composers may load a VST plugin and use a piano roll to input notes manually, while others may use MIDI-capable instruments to play in their ideas into a MIDI format.

Many modern composers (e.g., for film scores, game soundtracks, etc.) are abandoning traditional music notation in favor of MIDI composition for relative speed. But the process outlined above is effectively the same as traditional notation—sitting idly, tinkering by hand until an idea emerges.

Previous tools attempting to expose users to new musical ideas are still very limited in terms of variety and efficiency. Separately, many in the music industry are working toward music automation, in light of deadlines and budgets becoming ever tighter. Music automation (e.g., using only neural networks, artificial intelligence, machine learning, etc.) has posed other problems, however, in that automated solutions use music of the past as the input for their training data. As a result, new genres and ideas remain hidden, because the automated solutions may be locked into a particular style based on their inputs. Moreover, automated composition is generally less gratifying for composers who rely on automation.

Many composers invest significant amounts of money taking classes in songwriting, composition, and music, only to learn that music theory is just a language to describe how music of the past works. It takes many years of music theory to arrive to certain compositional techniques and conclusions. Music theory may be useful at least in terms of communicating to other composers or musicians, but most composers' choices depend on what sounds good subjectively to their ear, and they may completely ignore the theory.

Such inefficiencies and limitations described above may be a result of deficiencies in existing musical tools, but may also result from selective attention and/or artificial limitations of music theory. Any of these factors, among other constraints, may unnecessarily limit the options that musicians would typically consider.

BRIEF SUMMARY

Disclosed herein are system, apparatus, device, method and/or computer-readable storage-medium embodiments, and/or combinations and sub-combinations thereof, for a music composition aid. In this document, the term "user" may be substituted with the term "composer" within the scope of the disclosure contained herein.

In some embodiments, at least one computer processor may retrieve, via a memory, a first constraint value. The at least one computer processor may further receive, via a first module of a user interface, a selection of a set of musical elements.

In some embodiments, the at least one computer processor may further accept, via a module of a user interface, a second constraint value, corresponding to the set of musical elements, and store the second constraint value in memory. The at least one computer processor may additionally invoke an iterator function, using at least the second constraint value as an argument.

In some embodiments, the at least one computer processor may generate an output of the iterator function, limiting a size of the output of the iterator function according to the lesser of the first constraint value or a transform of the second constraint value. The output of the iterator function may include at least part of a subset of the set of musical elements. The subset may be determined by the second constraint value, and the size of the output may be less than or equal to the first constraint value.

In some embodiments, the at least one computer processor may invoke the iterator function in response to an input via the user interface, for example, when the output of the iterator function is not already stored in the memory. Moreover, the iterator function may include a coroutine, a generator, or a combination thereof. Additionally, or alternatively, the transform may include an enumerative combinatorial function, for example.

In some embodiments, the musical elements comprise a melody sequence, a chord, a chord note, a chord sequence, a rhythm sequence, a syllable, or a combination thereof. Additionally, or alternatively, the at least one computer processor may be integrated in a digital audio workstation (DAW) apparatus. In some embodiments, the rendering may include emitting audio output and/or displaying video output based at least in part on the output of the iterator function, for example.

In some embodiments, the at least one processor may further record, in the memory, metadata corresponding to at least one element of the output. Further, the metadata may include an indication of whether a given musical element of the output has been rendered, a rating, an element descriptor, a component descriptor, or a mood descriptor, for example.

Other embodiments, features, and advantages of the invention will be, or will become, apparent to one with skill in the art upon examination of the following drawings/figures and detailed description. It is intended that all such additional embodiments, features, and advantages be included within this description, be within the scope of this disclosure, and be protected by the claims that follow.

BRIEF DESCRIPTION OF THE DRAWINGS

The accompanying drawings are incorporated herein and form a part of the specification.

FIG. 5 is a screenshot illustrating an example interaction with some components of a user interface including a rhythm-length dropdown menu, according to some embodiments.

FIG. 6 is a screenshot illustrating an example interaction with some components of a user interface including rhythm shift buttons, according to some embodiments.

FIG. 7 is a screenshot illustrating an example interaction with some components of a user interface a rhythm permutation listing, according to some embodiments.

FIG. 9 is a screenshot illustrating an example interaction with some components of a user interface including a favorite rhythms listing, according to some embodiments.

FIG. 10 is a screenshot illustrating an example interaction with some components of a user interface including rhythm elements and metadata, according to some embodiments.

FIG. 15 is a screenshot illustrating an example interaction with some components of a user interface including a chord-type dropdown menu, according to some embodiments.

FIG. 16 is a screenshot illustrating an example interaction with some components of a user interface including a melody-length dropdown menu, according to some embodiments.

FIG. 17 is a screenshot illustrating an example interaction with some components of a user interface including a melody-type dropdown menu, according to some embodiments.

FIG. 18 is a screenshot illustrating an example interaction with some components of a user interface including a combinations-length dropdown menu, according to some embodiments.

FIG. 19 is a screenshot illustrating an example interaction with some components of a user interface including a MIDI-instruments dropdown menu, according to some embodiments.

FIG. 20 is a screenshot illustrating an example interaction with some components of a user interface including listings of chords and melody notes, according to some embodiments.

FIG. 22 is a screenshot illustrating an example interaction with some components of a user interface including listings of rhythm permutations and combinations, according to some embodiments.

FIG. 25 is a screenshot illustrating an example interaction with some components of a user interface including listings of favorite melodies and favorite chords in integer notation, according to some embodiments.

FIG. 26 is a screenshot illustrating an example interaction with some components of a user interface including melody elements and metadata, according to some embodiments.

FIG. 29 is a screenshot illustrating an example interaction with some components of a user interface including chord-type dropdown menus, according to some embodiments.

FIG. 30 is a screenshot illustrating an example interaction with some components of a user interface including selected listings of chord pairings in a progression, according to some embodiments.

FIG. 32 is a screenshot illustrating an example interaction with some components of a user interface including listings of chord permutations and combinations, according to some embodiments.

FIG. 35 is a screenshot illustrating an example interaction with some components of a user interface including chord elements and metadata, according to some embodiments.

FIG. 37 is another screenshot illustrating an example interaction with some components of a user interface including an export feature, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
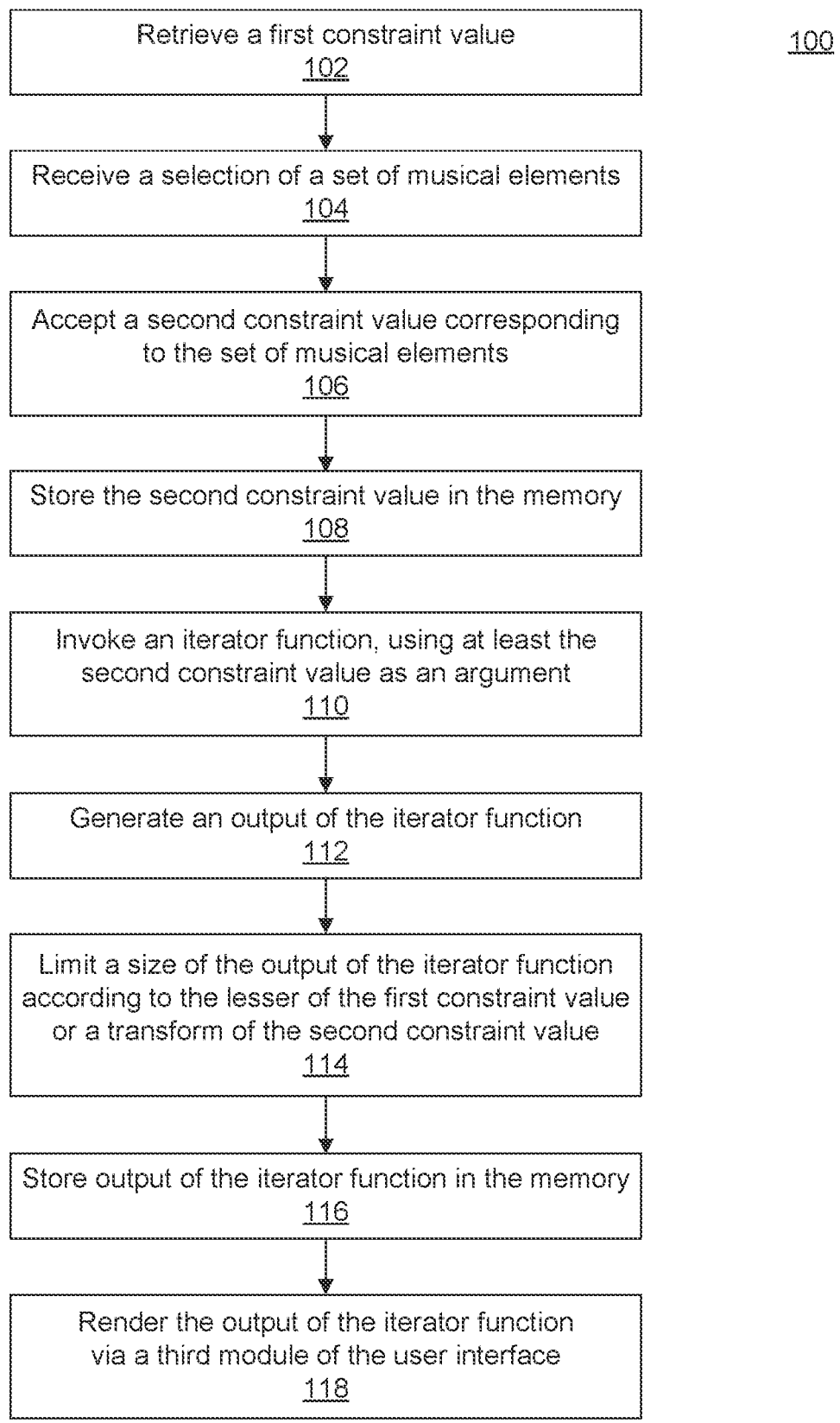
FIG. 1 is a flowchart illustrating a process implementing some of the enhanced techniques described herein, according to some embodiments.

Provided herein are system, digital audio workstation (DAW), apparatus, device, method, and/or computer-readable storage-medium embodiments, and/or combinations and sub-combinations thereof, for implementing a music composition aid.

Any of the embodiments provided herein may implement a composer's toolkit (CTK) as a collection of enhanced processing techniques that may model the processes of diffuse thinking and intuition to generate greater ranges of musical possibilities systematically. This modeling and generating may be accomplished, at least in part, by mathematically analyzing specific inputs and systematically generating multiple possible reusable patterns as outputs.

Advantages of reusability may be understood via other disciplines, such as software engineering or color theory, to name a few separate examples. To illustrate the advantages of reusability with color theory as applied to painting, for example, it is possible to begin with primary colors of red, blue, and yellow. With these three primary color elements, it is possible to generate all other colors, such as green, purple, orange, and so on. Creating these secondary colors from scratch each time would be inefficient.

Instead, such secondary colors may be reused. Similarly, musical elements and combinations thereof may be generated and reused in ways similar to colors on a palette. Rather than composing rhythms and melodies one piece at a time, for example, it may be possible and advantageous instead to generate sets of entire rhythms or melodies as complete units, then selecting desired units as a whole.

CTK as disclosed herein may package musical elements of any size or level of complexity into complete reusable units, allowing a composer to work with each generated element as an entire component instead of having to create those entire components each time. Each musical element may be treated as a modular building block. With CTK, composers may select unique rhythms and unique melodies as desired and may try them together to appreciate the net effect, efficiently facilitating the composition process. CTK may be leveraged to expose many musical options to let composers select their favorite outputs, and may generate effectively limitless varieties of musical content.

In some embodiments, CTK may generate musical elements on the fly, without intermediate database storage. Avoiding databases in the course of such generation may advantageously reduce a memory footprint and/or economize on data storage, especially when generating quintillions of permutations, combinations, rhythms, melodies, etc., for thousands of elements simultaneously, for example. Independently of musical element generation per se, separate serializations, files, or database schemes may be used for storage of data regarding a composer's favorite patterns or styles selected from the elements generated, in some example embodiments, without significantly affecting any on-the-fly generation of musical elements.

In some embodiments, CTK may include a code base that may use custom model-view-controller (MVC) design patterns to create a more robust architecture, allowing code to be quickly and seamlessly modified while retaining a clean and organized structure. The decoupled nature of this code may allow some sections of code to be modified without impacting the rest of the code. Some embodiments are described in further detail via the examples that follow below.

FIG. 1 is a flowchart illustrating a method 100 for operation of the enhanced music composition techniques described herein, according to some embodiments. Method 100 may be performed by processing logic that may comprise hardware (e.g., circuitry, dedicated logic, programmable logic, microcode, etc.), software (e.g., instructions executing on a processing device), or a combination thereof. Not all steps of method 100 may be needed in all cases to perform the enhanced techniques disclosed herein. Further, some steps of method 100 may be performed simultaneously, or in a different order from that shown in FIG. 1, as will be understood by a person of ordinary skill in the art.

Method 100 shall be described with reference to FIGS. 1 and 39. However, method 100 is not limited only to those example embodiments. The steps of method 100 may be performed by at least one computer processor coupled to at least one memory device. An example processor and memory device(s) are described below with respect to FIG. 39. In some embodiments, method 100 may be performed by components of computer system 3900 of FIG. 39, which may further include at least one processor 3904 and main memory 3908.

Figure 39:
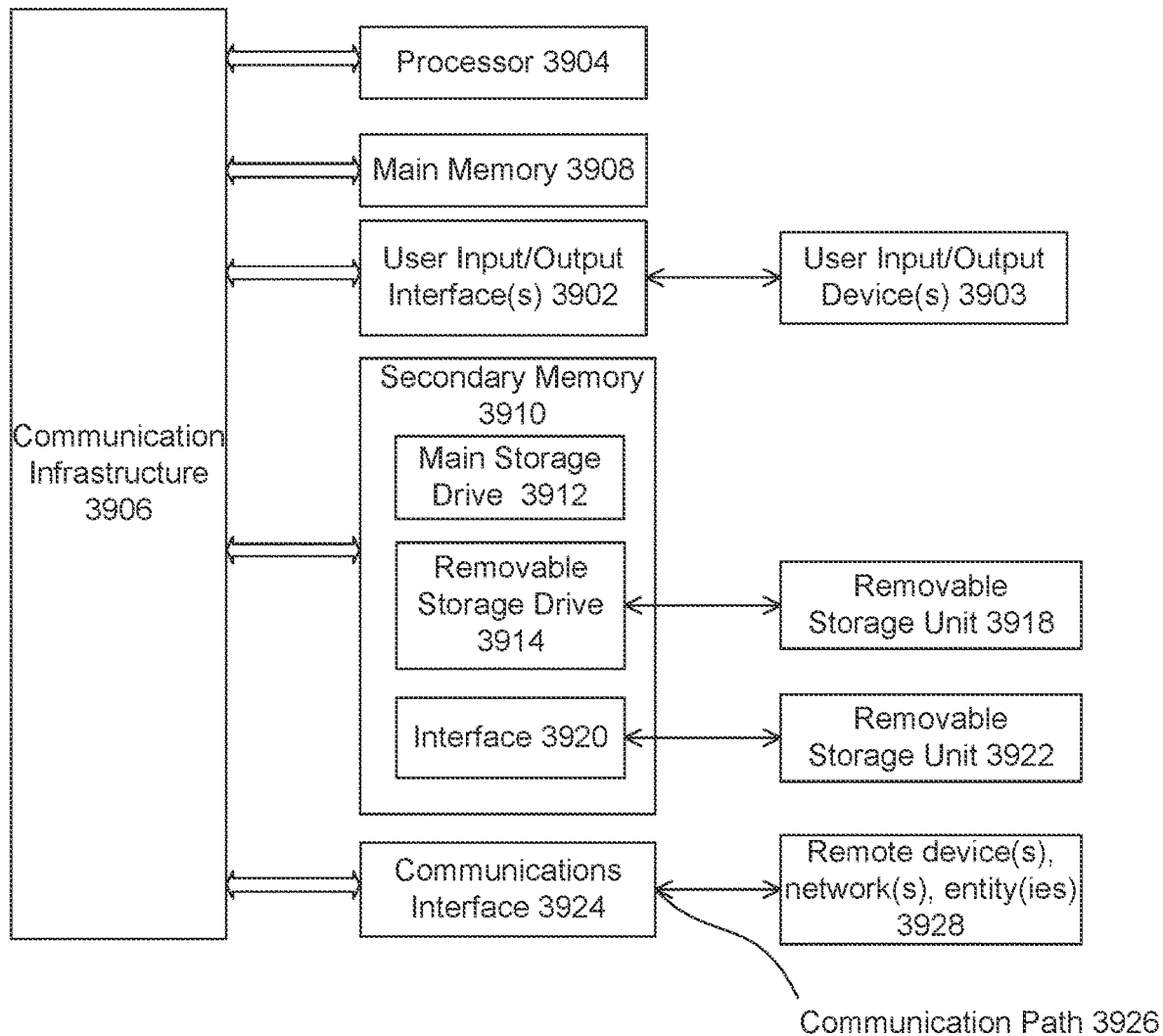
FIG. 39 is a diagram illustrating an example computer system useful for implementing various embodiments.

In 102, at least one processor, such as processor 3904, may be configured to retrieve a first constraint value, such as via a memory or storage device (e.g., any of elements 3908-3912 of FIG. 39). The first constraint value may be a limit on a size of intermediate data structures. In some embodiments, the first constraint may be a limit on list elements that may be generated in 112, as discussed further below. In some embodiments, the first constraint may be a batch limit or slice limit, e.g., for list slicing, iterable slicing in an iterator function, or equivalent function to allow efficient processing of data subsets and/or traversal of elements in a container, e.g., in a list, vector, array, matrix, tuple, or similar data structure.

An example of the first constraint includes the stop parameter of the islice function from the itertools functional programming module in the Python Standard Library, for example. The first constraint may serve as a boundary parameter for use with other types of coroutines, subroutines, threads, anonymous functions, higher-order functions, recurrence relations, or other programming techniques, including functional, object-oriented, data-driven, or procedural programming, to name a few non-limiting examples.

The first constraint may be adjusted for a particular system to manage available resources, e.g., processor 3904, memory or storage 3908-3912, or time for generating output, for example. In some embodiments, the first constraint may be defined by a programmer as a predetermined value (e.g., global constant). In other embodiments, the first constraint may be a variable that may be modified at runtime, e.g., via input from a user, runtime system metrics (including real-time or near-real-time updates of available system resources), command line, API, or other equivalent means of modifying parameters at runtime.

In 104, processor 3904 may be configured to receive a selection of a set of musical elements. For example, a set of musical elements may be a broad category of components of a musical composition in general, e.g., rhythm, melody, chords, etc. Narrower subcategories or subsets (e.g., syncopated rhythms, nota cambiata melodies, minor sixth chords, etc.) may also be considered a selection of musical elements for purposes of 104.

The selection of the set of musical elements may occur via input from a user, via semi-automated progression (e.g., a setup wizard), or input from another component, program, or device (e.g., a DAW or module thereof). The selection may be received by a first module of a user interface, for example. A user interface or any module thereof may include buttons, a tabbed layout, dropdown menus, text input, command line, voice input, keyboard shortcuts, other hardware selectors (e.g., rocker switches, multi-throw switches or knobs, pedals, etc.), such as on dedicated DAW hardware, for example.

Selections may be interactive, such as by a user at runtime, in some embodiments. Additionally, or alternatively, selections may be predetermined, such as by batch input, for example. Interacting with such elements, selections may be made via an input device, e.g., keyboard, touchscreen, touchpad, trackball, mouse, scroll wheel, knob, switch, pedal, or similar input device, in some embodiments. An example implementation of a user-interface may be based at least in part on a C++ library, such as JUCE, in some embodiments. JUCE or similar C++ libraries may interface with program components or libraries written in other languages, such as Python, Ruby, etc., via an application programming interface (API), foreign function interface (FFI), wrapper library, language binding, shared memory, translation layer, or other native interface, to name a few non-limiting examples.

In 106, processor 3904 may be configured to accept a second constraint value corresponding to the set of musical elements. The second constraint value may indicate a subset of the set of musical elements. For example, a user may wish to generate various melodies having six notes. A given system may be able to generate melodies of two to sixteen notes, in an embodiment. By accepting a second constraint, such as exactly six notes for a melody, melodies of other lengths may be eliminated, avoiding unnecessary generation of sequences that the user may not wish to consider.

The second constraint may be a variable that may be modified at runtime, e.g., via a second module of the user interface accepting input from a user, monitoring of runtime system metrics (including real-time or near-real-time updates of available system resources), command line, API, or other equivalent means of modifying parameters at runtime. The second constraint is also not limited to a single constraint. For example, with a melody, the second constraint may specify a number of notes and/or a musical interval or chord, further narrowing a subset of musical elements to be generated for consideration by the user, in some embodiments.

In 108, processor 3904 may be configured to store the second constraint value in the memory, e.g., main memory 3908. Additionally, or alternatively, the storing may store the second constraint value in a longer-term data store, such as any storage devices included in, or attached to, secondary memory 3910. The value of the second constraint, alongside any value of the first constraint where applicable, may be retained and passed as parameters, e.g., call by value, call by reference, call by sharing, etc., or as procedural parameters, in some embodiments. Values may be accepted or otherwise used by one or more modules or functions, including iterator functions, for example. The value of such a parameter may be received by an iterator function as an argument, as described with respect to 110 below.

In 110, processor 3904 may be configured to invoke a function, such as an iterator function, using at least the second constraint value as an argument. In some embodiments, the first constraint value may also be passed as an argument when invoking the iterator function. Additionally, or alternatively, the first constraint may be read by the iterator function via a global or system-wide variable or shared memory space, at a time of invocation, execution, or runtime of a given iterator function, for example. Other functionally equivalent methods of invocation, e.g., of procedures or functions, with any of the first or second constraint values may be contemplated within the scope of this disclosure.

In 112, processor 3904 may be configured to generate an output of the iterator function. The output of the iterator function may include at least part of a subset of the set of musical elements. The subset may be determined by the second constraint value, in some embodiments.

For example, the selected set of musical elements may include rhythms in a given meter of regular beats, where a given beat may be strong or weak (e.g., stressed or unstressed beats, on- or off-beats, up- or down-beats, pulses or rests, etc.). The second constraint may have a value of [4] (e.g., a list of one element that equals four). In this case, the second constraint may limit a resulting output set to rhythms having four beats, and where any of the four beats may be stressed or unstressed. Considering only the possible rhythms of four beats, the output of the iterator function here may be either stressed or unstressed (two possible values based on the selected set), such that the rhythmic possibilities are $2^4$ (2^4), being sixteen possible orders (permutations) of the beats, allowing repetition of the same beat sequentially or throughout the sequence, for example.

Accordingly, the output of the iterator function in this example may be the resultant set of all sixteen permutations of beats, e.g., all four beats unstressed, first three beats unstressed with last beat stressed, only the third beat stressed, and so on, through having all four beats stressed, in this example. The order in which the beats are presented may also be varied per system defaults or user preferences, such as by a user-interface setting.

In 114, processor 3904 may be configured to limit a size of the output of the iterator function, according to the lesser of the first constraint value or a transform of the second constraint value, where the size of the output is less than or equal to the first constraint value. In an example of 112 and 114, the selected set of musical elements may be melodies in an octave of a diatonic scale, which has seven distinct tones (e.g., do-re-mi-fa-so-la-ti). The second constraint, in this example, may have a value of [4] (e.g., a list of one element that equals four). In this case, the second constraint may limit a resulting output set to melodies having four notes, any of which may be selected from the seven possible tones in the selected diatonic scale. As permutations allowing repetition, the melodic possibilities are $7^4$ (7^4), being 2401 possible orders (permutations) of the notes, selected from seven distinct tones.

In this example, the output of the iterator function may not necessarily be all 2401 melodic permutations. Subject to the value of the first constraint, if the value of the second constraint exceeds the value of the first constraint, the actual number of output elements may be that of the first constraint value, or fewer, in some embodiments. Thus, if the value of the first constraint is [1000] (e.g., a list of one element that equals 1000), the iterator function may be a generator configured to return the first 1000 elements of the set of 2401 melodic permutations of four diatonic notes as output, for example. Thus, in addition to mathematical generation of (sub)sets of musical elements, other algorithms may be used to streamline generation and/or delivery of results, e.g., divide-and-conquer algorithms, segmentation, partitioning, etc.

Additionally, in this case, the iterator function may be called again with a modified first constraint value, e.g., [1001, 2000] (e.g., a list of two elements, 1001 and 2000), generating the next 1000 elements in the set of 2401 melodic permutations. Thus, in some embodiments, the first constraint value may be a list comprehension, set comprehension, or set-builder notation value enumerating or specifying domain for a subset of a set of musical elements bounded by the second constraint value. As described above, the second constraint value, like the first constraint value, may be a list, vector, array, matrix, tuple, or similar data structure, for example, and the first constraint value may be a slice limit or batch limit.

Thus, the output of the iterator function may be kept at a manageable level within physical constraints of hardware with limited computing power and storage capacity (see 116 below). For larger sets or subsets of musical elements, sheer data volume of representations (e.g., integer notation, letter notation, etc.), may lead to data sets that are too large to store in memory of a given computer system (e.g., main memory 3908 of computer system 3900).

In 116, processor 3904 may be configured to store the output of the iterator function in the memory. In some embodiments, the output of the iterator function may not fit in the memory without performing 114 as described above. As also described further above, the value of the first constraint may be adjusted manually or automatically depending on system hardware constraints, to ensure, for a given system specification and/or user preference, that the output of the iterator function may safely be stored in a given memory (e.g., main memory 3908 and/or secondary memory 3910 of computer system 3900).

For example, if selecting melodies of two to sixteen notes on a chromatic scale of twelve distinct tones, the second constraint value may be, in some embodiments, an enumerated list of [2, 3, 4, 5, 6, 7, 8, 9, 10, 11, 12, 13, 14, 15, 16], or equivalent programmatic representation, comprehension, specification, etc. Thus, the total number of possible melodic permutations ($\Sigma_{n=2}^{16} 12^n$) may reach more than two-hundred quadrillion possibilities. Even efficient representations of total output sets may expand to many terabytes or petabytes of data, in some cases, even with compression. These data representations alone may exceed overall available storage capacity of many computer systems (e.g., secondary memory 3910 including any removable storage 3918 or 3922), according to some embodiments.

Without the first constraint (e.g., batch limit or slice limit) in combination with an iterator function such as a coroutine or generator, sizes of the resultant data sets may push the envelope of complex, high-end computing systems, becoming "big data" problems impractical for most independent music composers to provision for, let alone for attention spans of human musicians attempting to test many different composition ideas while avoiding fatigue. Combined with output of rendered elements (see 118 below), size of resultant output data may grow several times more without appropriate constraint values. At least as a result of 114, and depending on an appropriate value of the first constraint for a given computer system 3900, resultant output sets of musical elements may be reasonably and safely stored in a given memory (e.g., main memory 3908 and/or secondary memory 3910 of computer system 3900), in some embodiments.

In 118, processor 3904 may be configured to render the output of the iterator function via a third module of the user interface. In some embodiments, the output of the iteration function may be stored (per 116) in a memory or storage, where the output may be a data representation of a musical element (e.g., rhythm, melody, chord, or a combination thereof). The representation may include, constitute, or be translated to, messages or instructions for audio playback, such as via a standard Musical Instrument Digital Interface (MIDI), to name one non-limiting example.

The representation may be retrieved by a rendering engine or other program, function, module, driver, device, DAW, or comparable mechanism that may be configured to render musical output audibly (sonification) and/or visually (visualization). Such sonification or visualization may be rendered and/or controlled via the third module of the user interface, which may be a physical or virtual button, knob, slider, keyboard, frame, scope, window, monitor, etc., in some embodiments. A rendering engine may include or connect to an audio adapter or video adapter, for example.

Sonification may be realized via at least one digital-to-analog converters (D/A, D2A, DAC), audio sequencer, synthesizer, mixer, DAW, MIDI controller, or combination thereof, among other comparable devices, which may further be communicatively coupled to at least one loudspeaker or loudspeaker array, for example. Visualization may be a synchronous transform of an audio signal converted to image(s) or a video sequence, for example. Additionally, or alternatively, in some embodiments, visualization may include a display of musical notation (e.g., score, tablature, MIDI message) or graphical representation thereof.

Any rendering may be quickly toggled across different musical elements of the output of the iterator function, such as via the third module of the user interface, or via a similar module, in some embodiments. Some examples may include hotkeys or click-play-click-play paradigms that may allow a user to advance through musical elements within a given set or subset of iterator function output, in a way that is quick and efficient, allowing systematic coverage of elements that have not yet been rendered (e.g., sonified or visualized for consideration by the user). This interaction may continue, in some use cases, until a user has found enough musical elements to be satisfactory, for example.

In some embodiments, metadata may be associated with any given element or rendering. Such metadata may include an indication of whether a given musical element of the output has been rendered, a rating, an element descriptor, a component descriptor, or a mood descriptor. Such metadata may further include associations with other musical elements, e.g., attaching at least one chord to a melody and/or attaching at least one melody to a rhythm, etc.

Additionally, these metadata may also allow easy retrieval in the future, e.g., for favorite elements, highly-rated elements, elements that evoke a specific subjective mood or reaction in the user, etc. Additional descriptions of the CTK user interface are described further below. A composer may be able to input a new tag or descriptor within the Favorites portion of CTK. Each rhythm, chord, melody, lyric, instrumentation, or a combination thereof, may then be tagged with a mood or description, for example.

These metadata may allow systematic review of output elements by a user for the first time considering the elements in a given composition project. Additionally, indications of whether musical elements have been rendered or considered may be compiled into a history, along with groups of favorites, ratings, moods, or other descriptors or metadata tags, for example. Retrieval of history items may be performed in batches of a predetermined size, such as for memory efficiency, according to some embodiments.

A composer may be able to use their own vocabulary to describe how they perceive these musical elements. For example, if a composer may wish to classify a chord as subjectively sounding dark and brooding, the user may tag and search for all chords that may fit this description, in some embodiments. Music may evoke different emotions, for which composers may want a way to describe consistently for later recall, categorization, and grouping. For example, film score composers may be able to search quickly for the musical elements that evoke a specific mood for corresponding scenes of a screenplay.

Referring to the CTK user interface, some embodiments of CTK may include a rhythm tab that may use integer partitions to create a rhythmic sequence. Permutations on the resulting sequence may reveal, within the first or second constraint values, rhythmic variations that are possible. Shifting or rotating the sequence may aid this process as well.

Figure 2:
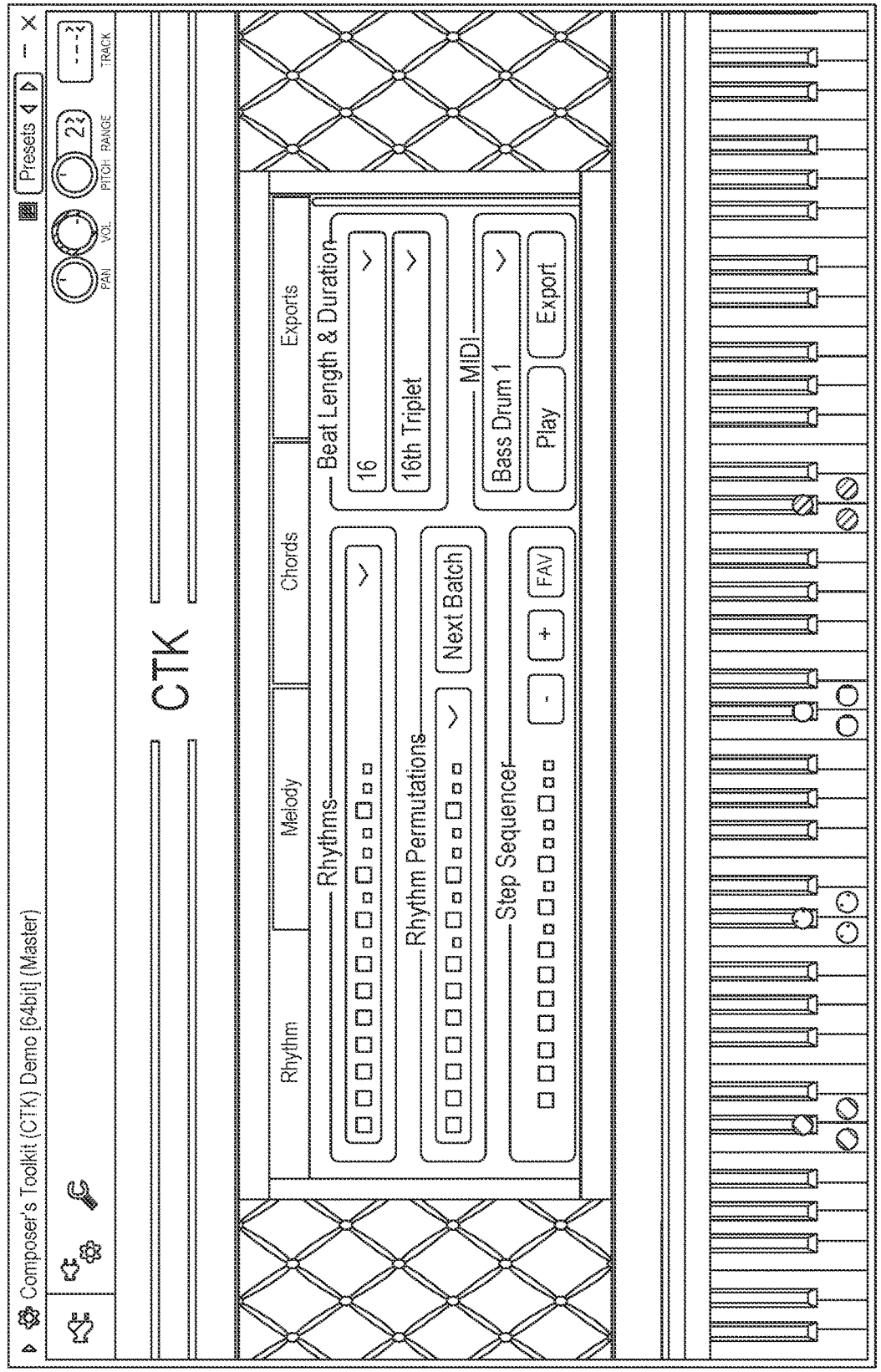
FIG. 2 is a screenshot illustrating an example interaction with some components of a user interface including a rhythm tab, according to some embodiments.
Figure 3:
FIG. 3 is another screenshot illustrating an example interaction with some components of a user interface including a rhythm tab, according to some embodiments.

FIG. 2 is a screenshot illustrating an example interaction with some components of a user interface including a rhythm tab, according to some embodiments. FIG. 3 is another screenshot illustrating an example interaction with some components of a user interface including a rhythm tab, according to some embodiments, in an alternative arrangement from that of FIG. 2.

Figure 23:
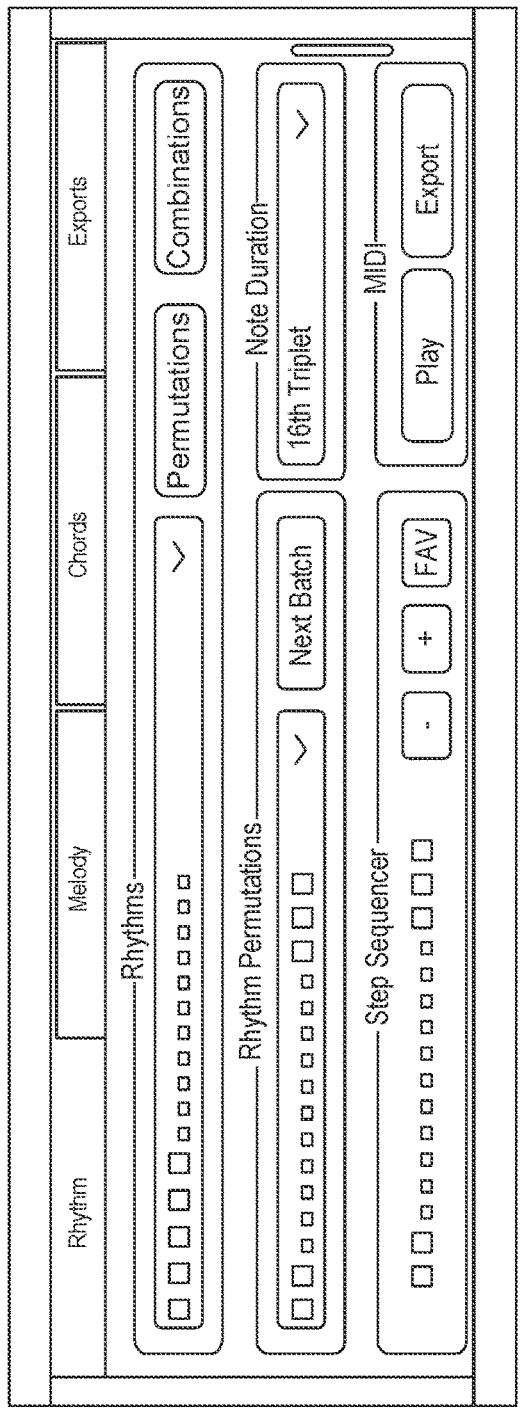
FIG. 23 is a screenshot illustrating an example interaction with some components of a user interface including a step sequencer and rhythm beats visualizations, according to some embodiments.

Among other user-interface elements, FIG. 2 shows a display of rhythms using a graphical representation of stressed and unstressed beats in a rhythm element. In some embodiments, the graphical representation may be glyphs in a font, for example. By contrast, FIG. 3 shows a display of various rhythms in integer notation, as well as a visual display using checkboxes, in an embodiment separate from that of FIG. 2. In some embodiments, user-interface modules of FIG. 2 and FIG. 3 may be combined in the same embodiment, as shown in FIG. 23 further below, for example.

For example, if a composer wants a sequence of 16 beats, a partition of beats may end up being 1 1 1 1 1 1 2 2 3 3=16, in decimal integer notation. From here a composer may convert these integers into a corresponding binary form where the partition values of n begin with a stressed beat ('1') and are followed by n−1 unstressed beats ('0'), in some embodiments, becoming 1 1 1 1 1 1 1 0 1 0 1 0 0 1 0 0. This may also be viewed and controlled with a sequence of checkboxes such as in FIG. 4.

Figure 4:
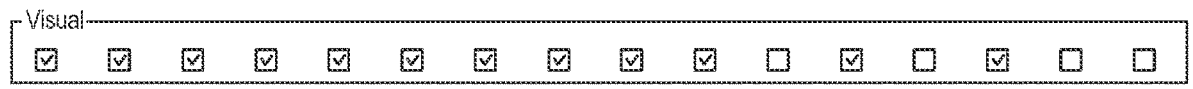
FIG. 4 is a screenshot illustrating an example interaction with some components of a user interface including a checkbox visualization of beats, according to some embodiments.

FIG. 4 is a screenshot illustrating an example interaction with some components of a user interface including a checkbox visualization of beats, according to some embodiments. The visualization of FIG. 4 is an alternative embodiment of the graphical representation of stressed and unstressed beats shown in FIG. 2. Similarly, the checkbox representation may be based on rendered text implemented by glyphs in a font.

This visual display (in either or both of FIG. 2 or 4) may represent a step sequencer. If there is a check in the step sequencer then it means a composer may play the rhythm at that point in time. If there is no check in the step sequencer then, in some embodiments, nothing is played. In some embodiments, a specific default value may be specified for unchecked boxes, including an unstressed beat, for example.

Figure 5:
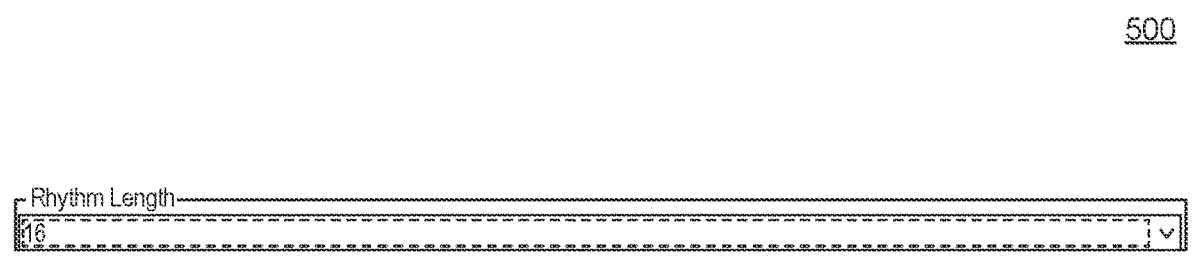

FIG. 5 is a screenshot illustrating an example interaction with some components of a user interface including a rhythm-length dropdown menu, according to some embodiments. A composer may select how long they want the rhythmic sequence to be. In this particular example, the number of beats and tempo/duration of beats (or triplets) may be set to determine an overall length of the rhythmic sequence. The number of beats in a rhythmic sequence, according to an embodiment, may range from 3 beats to 16 beats. As soon as the composer selects a Rhythm Length, the Rhythms list box may be populated with all the possible integer partitions for that length.

Figure 6:
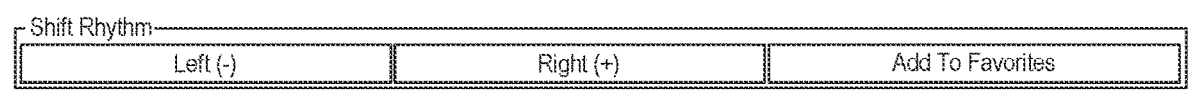

FIG. 6 is a screenshot illustrating an example interaction with some components of a user interface including rhythm shift buttons, according to some embodiments.

The Left (−) button may shift or rotate the rhythmic sequence to the left. The Right (+) button may shift or rotate the rhythmic sequence to the right. Shift functionality and/or rotate functionality may allow the composer to discover more rhythmic variations.

The Add To Favorites button lets the composer add the current binary rhythm sequence (as seen in the Visual section) to the Favorites list box. This may let the composer store a given favorite rhythmic sequence in a list box if that sequence does not already exist in the list box. A Next Batch button (not shown) may be selected to find additional different permutations of a given rhythm length, for example.

When a composer adds a favorite rhythm to the list box, the binary rhythm sequence may be converted into an integer partition sequence, in some embodiments.

FIG. 7 is a screenshot illustrating an example interaction with some components of a user interface for a rhythm permutation listing, according to some embodiments.

After the integer partition is selected in the Rhythms list box, the composer may hit the Next Batch button to calculate permutations of that integer partition sequence. The calculated permutations may then be displayed in accordance with the composer's preferences.

In some embodiments, due to efficiency requirements, or to save memory, to name a few possible system constraints, a limited number of permutations (e.g., up to a thousand) may be generated at a time. A composer may then hit the Next Batch button again to generate the next set of permutations.

Figure 8:
FIG. 8 is a screenshot illustrating an example interaction with some components of a user interface including dropdown menus for beats and MIDI instruments, according to some embodiments.

FIG. 8 is a screenshot illustrating an example interaction with some components of a user interface including drop-down menus for beats and MIDI instruments, according to some embodiments.

A composer may play a rhythmic sequence using, in some embodiments, 128 different MIDI instruments, for example. Instruments may be changed in the first drop-down menu, to name an example user-interface element for selection.

The second drop down may let the composer select how they want the rhythmic sequence to be interpreted in terms of its note value, in some embodiments. For example, selecting "16th" may interpret each beat as a 16th note.

The Play button may play the currently selected rhythmic sequence in the Visual section. Audio playback may be generated via MIDI, according to some embodiments.

The Play button shown in FIG. 8 is an example providing an interface conforming to a click-play-click-play paradigm that may allow a user to advance through musical elements within a given set or subset of iterator function output (e.g., from method 100), in a way that is quick and efficient FIG. 9 is a screenshot illustrating an example interaction with some components of a user interface including a favorite rhythms listing, according to some embodiments.

The Favorites list box may store all the rhythmic sequences that the composer has selected, for example. In some embodiments, duplicate sequences may be disallowed or eliminated from this list box, such as via a deduplication function, for example.

When a composer selects a favorite rhythmic integer partition, the Visual section may be automatically updated with the selected rhythm, in some embodiments. A composer may play their favorite rhythms by selecting a rhythm from the Favorites section and hitting Play in the MIDI section. A composer may also delete a rhythm from the Favorites list box.

Separately, Table 1 shows a non-limiting range of possibilities for one particular example configuration. For example, selecting a rhythm length of 16 beats may allow for nearly 21 trillion different rhythms in some configurations. Allowing a composer to sort through these efficiently and select favorite rhythms as desired may present significant advantages for creativity and productivity.

TABLE 1

| | |
|---|---|
| Rhythm Length Range: | 3 to 16 beats |
| Partition Range: | 3 to 231 partitions |
| Max MIDI instruments: | 128 total instruments |
| Note Value | Quarter, 8th, 8th triplet, 16th, |
| Playback: | 16th triplet, 32nd, 32nd triplet |
| Rhythmic Range: | 3! to 16! (6 to 20,922,789,888,000) different rhythms |

FIG. 10 is a screenshot illustrating an example interaction with some components of a user interface including rhythm elements and metadata, according to some embodiments.

In some embodiments, metadata may be associated with any given element or rendering. Such metadata may include an indication of whether a given musical element of the output has been rendered, a rating, an element descriptor, a component descriptor, or a mood descriptor. These metadata may allow systematic review of output elements by a user for the first time considering the elements in a given composition project. Additionally, these metadata may also allow easy retrieval in the future, e.g., for favorite elements, highly-rated elements, elements that evoke a specific subjective mood or reaction in the user, etc. In some embodiments, metadata may include associations with other musical elements, for example.

Figure 11:
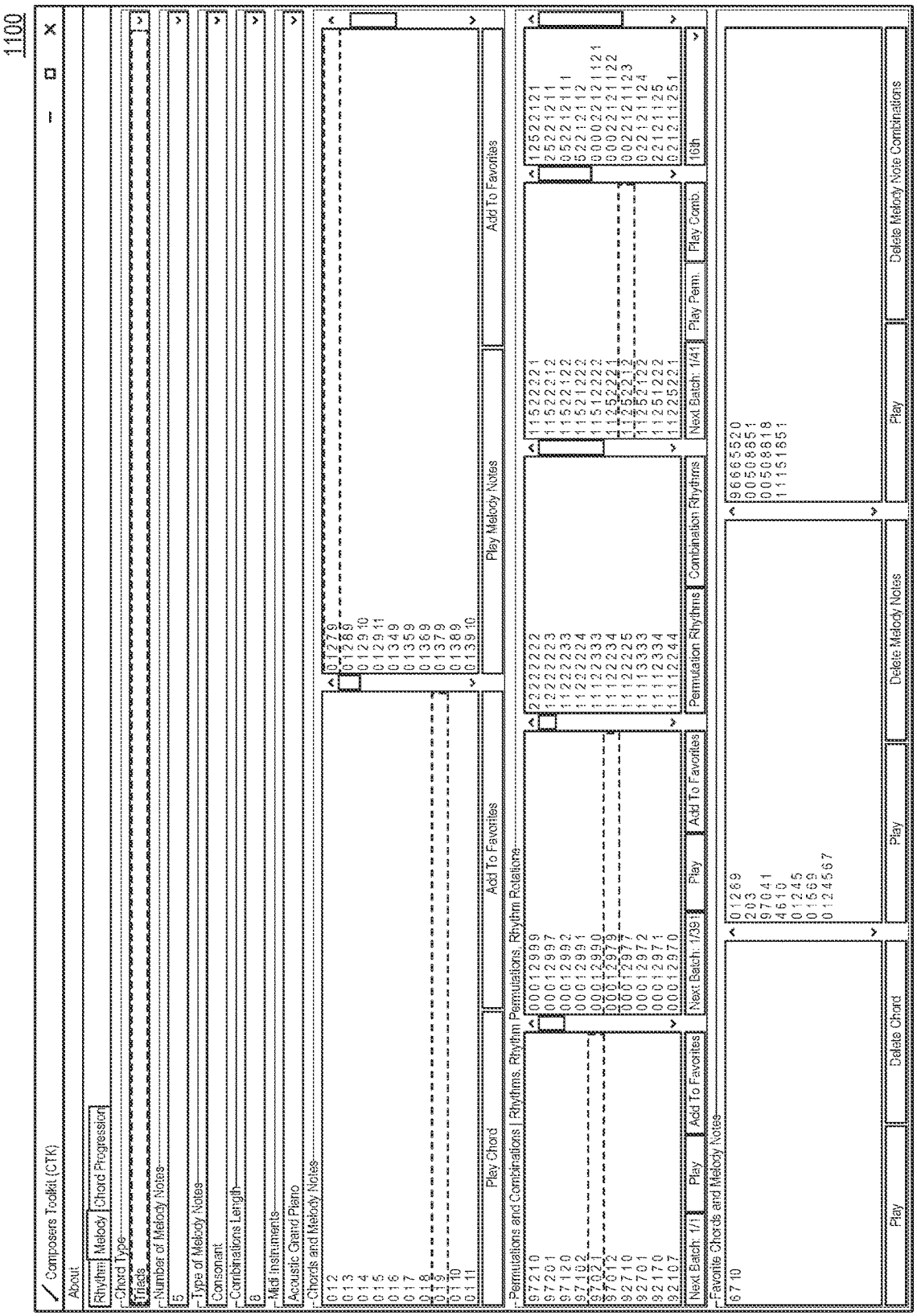
FIG. 11 is a screenshot illustrating an example interaction with some components of a user interface including a melody tab, according to some embodiments.

FIG. 11 is a screenshot illustrating an example interaction with some components of a user interface including a melody tab, according to some embodiments.

The melody tab may generate chords, in some embodiments, including every chord that may exist for a specified set of notes or within a specified pitch range. Once a chord is selected, CTK may generate all the melody notes that work with that chord.

Instead of calculating all the chords that come from a scale, in some embodiments, CTK may start with the chord and find all the possible note sequences that may work with that chord. From here, CTK may be configured to calculate up to every permutation and combination possible for a melody note sequence. CTK may then take these sequences and assign up to every possible rhythm of up to the selected maximum length. A composer may select desired sequences from results presented by CTK via a user interface.

Figure 12:
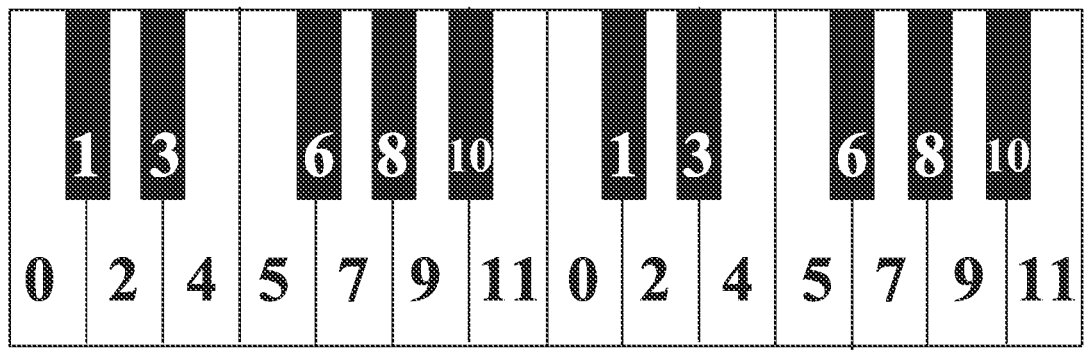
FIG. 12 is a screenshot illustrating an example interaction with some components of a user interface including an integer-annotated keyboard, according to some embodiments.

FIG. 12 is a screenshot illustrating an example interaction with some components of a user interface including an integer-annotated keyboard, according to some embodiments.

Notes (e.g., C, C#/D♭, D, D#/E♭, E, F, F#/G♭, G, G#/A♭, A, A#/B♭, B) may be represented by numbers, in this case integers, in some embodiments. Besides integer partitions and/or letter notes (A-G), other notation schemes may be used to represent specific musical notes, including for various other tonal or atonal arrangements. The figure below shows equivalent piano keys corresponding to the note that each number may represent, in the example embodiment shown in FIG. 12.

Figure 13:
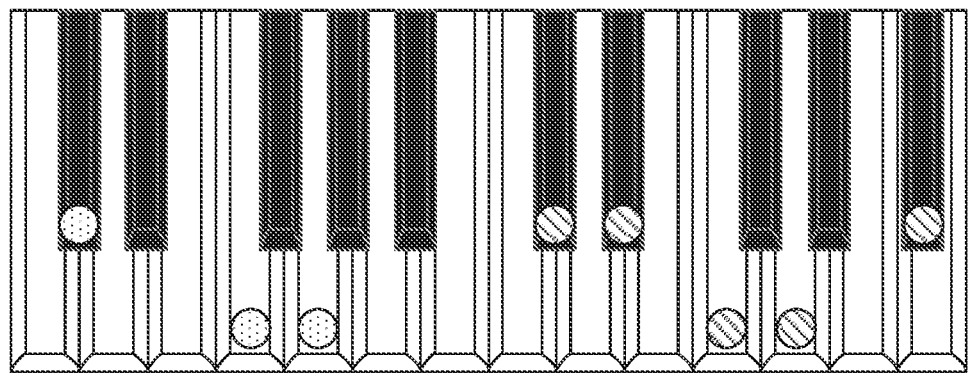
FIG. 13 is a screenshot illustrating an example interaction with some components of a user interface including multi-colored indicators of keyboard finger positions for two hand positions, according to some embodiments.

FIG. 13 is a screenshot illustrating an example interaction with some components of a user interface including multi-colored indicators of keyboard finger positions for two hand positions, according to some embodiments.

The two hand positions as shown in FIG. 13 may be highlighted with color fills, markers, or other symbols, and may further have a unique color for each hand position. The two hand positions shown may be sequential, such as for a chord progression, or simultaneous, such as may be possible for one keyboardist in a solo and/or two keyboardists in a duet. The hand positions shown are not limited only to arrangements playable by human keyboardists, but may also serve as an aid for music theory in compositions for computerized or electronic music not readily playable by human keyboardists.

Figure 14:
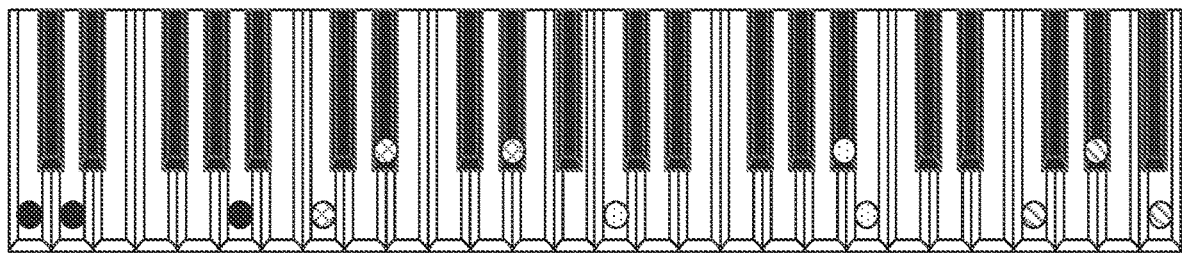
FIG. 14 is a screenshot illustrating an example interaction with some components of a user interface including multi-colored indicators of keyboard finger positions for four hand positions, according to some embodiments.

FIG. 14 is a screenshot illustrating an example interaction with some components of a user interface including multi-colored indicators of keyboard finger positions for four hand positions, according to some embodiments.

The four hand positions as shown in FIG. 14 may be highlighted with color fills, markers, or other symbols, and may further have a unique color for each hand position, or for each possible human player, for example. The four hand positions shown may be sequential, such as for a chord progression, or simultaneous, such as may be possible for two keyboardists in a duet. The hand positions shown are not limited only to arrangements playable by human keyboardists, but may also serve as an aid for music theory in compositions for computerized or electronic music not readily playable by human keyboardists.

Thus, for the some portions of CTK, e.g., handling chords and/or melodies, a graphical user-interface element may show a graphic of a keyboard with the notes highlighted. This may help to identify chords visually without having to rely on written notation (e.g., integer, letter, solmization, etc.).

Figure 15:
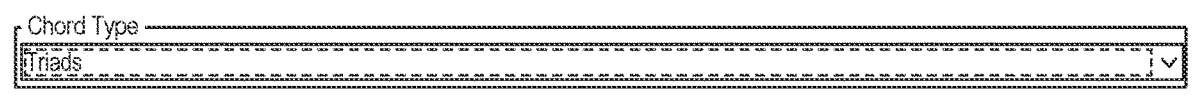

FIG. 15 is a screenshot illustrating an example interaction with some components of a user interface including a chord-type dropdown menu, according to some embodiments.

A composer may select diads (2-note chords, also referred to as intervals) up to dodecads (12-note chords). When a chord type is selected, the Chords list box may show up to every n-note chord possible within a specified range. For example, if triads are selected, then various 3-note chords in a range may be listed.

Figure 16:
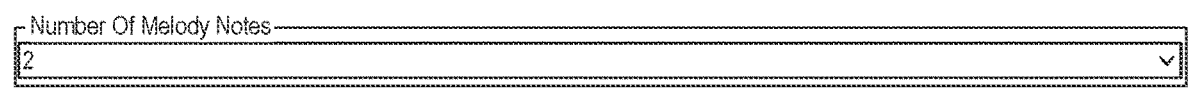

FIG. 16 is a screenshot illustrating an example interaction with some components of a user interface including a melody-length dropdown menu, according to some embodiments.

When a composer selects a chord, the composer may want to generate an arbitrary number (n) of melody notes based on the chord. This may be reflected in the Melody Notes list box.

Figure 17:
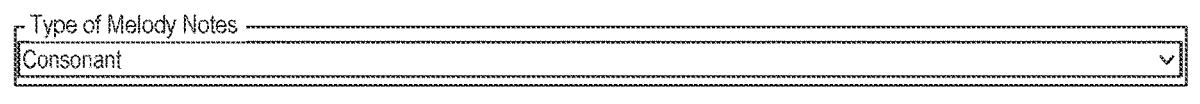

FIG. 17 is a screenshot illustrating an example interaction with some components of a user interface including a melody-type dropdown menu, according to some embodiments.

The melody-type dropdown menu may provide a composer with an option to select whether or not the notes generated are desirable to the composer with respect to the chord. A composer may want this option, because adding notes that are not contained in the chord may create dissonance, in some cases. This selection feature may keep both tonal and atonal options open to the composer, in some embodiments. This may be reflected in the Melody Notes list box (see FIGS. 11, 20, and 21 herein).

Figure 18:
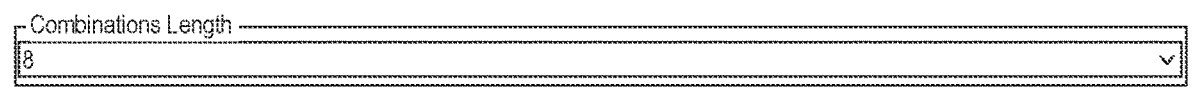

FIG. 18 is a screenshot illustrating an example interaction with some components of a user interface including a combinations-length dropdown menu, according to some embodiments.

A composer may generate a melody note sequence combination of an arbitrary length n. For example, if a composer chooses a combination length of 8 on a 4-note melody (0 1 2 6 8) sequence, then all the possible combinations that are 8 notes long and contain only 4 of the notes (0 0 0 1 2 8 8 8) may get displayed in the Combinations list box, in some embodiments.

Combinations may let a composer repeat certain notes in the melody, in some embodiments. This may make a composer's selected note sequences sound more musical to the composer, for example, because melody notes in the real world may repeat.

Figure 19:
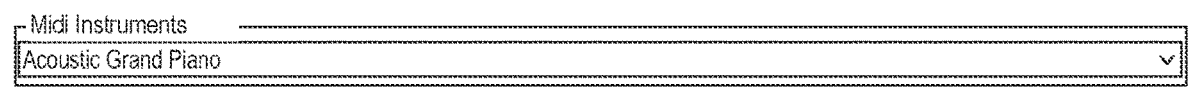

FIG. 19 is a screenshot illustrating an example interaction with some components of a user interface including a MIDI-instruments dropdown menu, according to some embodiments.

A composer may play both chords and melody sequences using, for example, 128 different MIDI instruments, in some embodiments. Instruments may be changed in a drop-down menu, to name one possible GUI element for selection, among other possible options.

FIG. 20 is a screenshot illustrating an example interaction with some components of a user interface including listings of chords and melody notes, according to some embodiments.

When a composer selects a chord from the Chords list box, the Melody Notes list box may get populated with all the notes that the composer indicated as being suitable or unsuitable to combine with the selected chord. This may be stored persistently, such as in a database, serialization, file, or other type of data store. This may facilitate a composer later finding which notes are favored by the composer with the same or similar chords, for example.

The Play Chord button may play the currently selected chord. The Play Melody Notes button may play both the currently selected chord and the melody note sequence at the same time. This may let composers hear how the melody sounds over the chord. Audio playback may be generated via MIDI.

The Add To Favorites button may allow a composer add their favorite chord or melody note sequence to the Favorites section.

Figure 21:
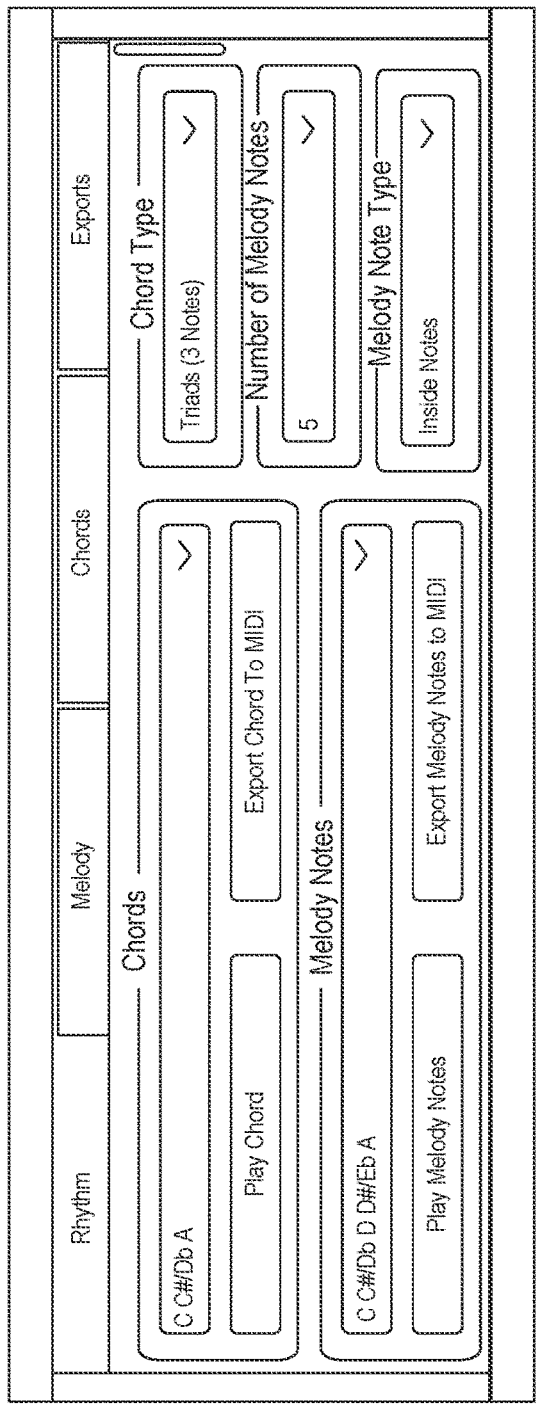
FIG. 21 is another screenshot illustrating an example interaction with some components of a user interface including listings of chords and melody notes, according to some embodiments.

FIG. 21 is another screenshot illustrating an example interaction with some components of a user interface including listings of chords and melody notes, according to some embodiments.

Figure 22:
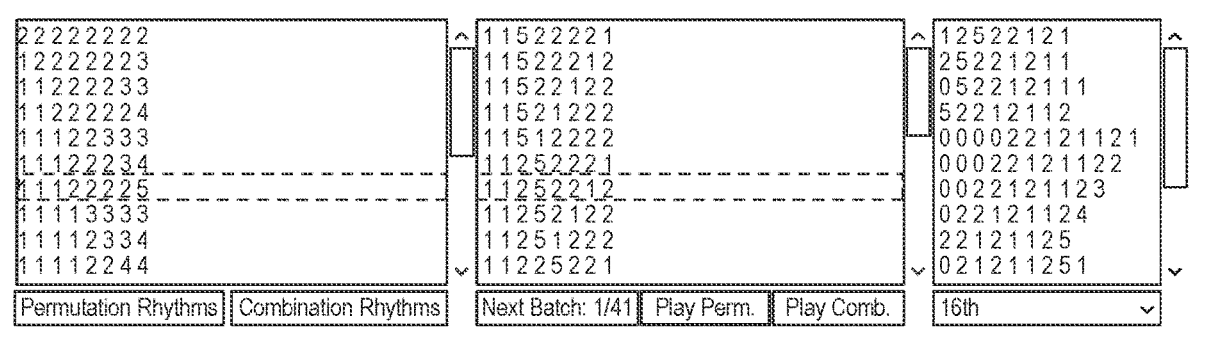

FIG. 22 is a screenshot illustrating an example interaction with some components of a user interface including listings of rhythm permutations and combinations, according to some embodiments.

In some embodiments, the list boxes as shown in FIG. 22 may be employed, in no particular order, to name a few non-limiting examples: Permutations, Combinations, Rhythms, Rhythmic Permutations, and Rhythmic Rotations. Any other order or elements may be presented here.

This section lets a composer perform controlled experiments on finding the best melody and rhythm combination as well as showing all the possible ways to play a selected melody sequence. Once a melody note sequence is selected, a composer may use the Next Batch button to generate all the permutations and combinations on that sequence.

The Permutation Rhythms and Combination Rhythms buttons may generate all the rhythms that may be played with the n number of notes in each melody sequence. Once a permutation or combination rhythm is generated, a composer may select a rhythm in the Rhythms list box and all the rotations/shifting may be performed on the rhythmic sequence. This may assist a composer in finding additional rhythmic variations.

The Play buttons may play all melody permutations (with chord), melody combinations (single notes), melody permutations with rhythm, and melody combinations with rhythm.

The drop-down under the Rhythm Rotations list box lets the composer select how they want the rhythmic sequence to be interpreted in terms of its note value. For example, selecting "16th" may interpret each beat as a 16th note.

The Add To Favorites button lets a composer add their favorite chord, melody sequence, and permutation and combination melody note sequences to the Favorites section.

FIG. 23 is a screenshot illustrating an example interaction with some components of a user interface including a step sequencer and rhythm beats visualizations, according to some embodiments.

The Favorites section stores entries and/or listings of a given composer's favorite chords, melody notes, and melodic permutations/combinations. In some embodiments, such stored entries and/or listings may be deduplicated.

A composer may play their favorite chords or melodies by selecting a sequence from the Favorites section and hitting the Play button.

A composer may also delete any chord or melody sequence from the Favorites list boxes.

In an example embodiment, the first list box may contain favorite chords selected by a composer. The second list box may contain the composer's favorite melody notes obtained from a specific chord. The third list box may contain melody notes that were generated using permutations and combinations. Any other order or combination of list boxes or elements may be used here.

As shown by way of non-limiting examples above, the melody tab may be used to generate combinations and/or permutations of notes within a selected chord, for any chord. At a different level, the chord progression tab (described below) may be used to generate chord progressions based on combinations and/or permutations in a similar way.

Separately, Table 2 shows a non-limiting range of possibilities for one particular example configuration. For example, selecting a rhythm length of 12 beats as a second constraint value (see method 100) may allow for nearly a half-billion different rhythms in some configurations. Melodies ranging up to 12 notes long in a 12-note scale may allow for nearly a half-billion combinations of notes. Rearranging the order of the notes in these possible melodies allows for more permutations by orders of magnitude, for nearly 185 quadrillion unique melodies.

TABLE 2

| | |
|---|---|
| Chord Types: | Diads (2 notes), Triads (3 notes), Tetrads (4 notes), Pentads (5 notes), Hexads (6 notes), Heptads (7 notes), Octads (8 notes), Nonads (9 notes), Decads (10 notes), Undecads (11 notes), Dodecads (12 notes) |
| Max Chords Possible: (in a 12-note chromatic scale) | Diads (66), Triads (220), Tetrads (495), Pentads (792), Hexads (924), Heptads (792), Octads (495), Nonads (220), Decads (66), Undecads (12), Dodecads (1) Total = 4083 Possible Chords |
| Number of Melody Notes Range: | 2 to 12 notes |
| Type of Melody Notes: | Consonant or Dissonant |
| Combinations Length Range: | 2 to 16 notes |
| Max MIDI instruments: | 128 total instruments |
| Combinations Range: | 2! to 12! (up to 479,001,600) note combinations |
| Permutations Range: (Number of Melody Notes (m) to the power of Combinations Length (c) = $(m^c)$) | $2^2$ to $12^{16}$ (up to 184,884,258,895,036,416) different melodies |
| Rhythm Length Range: | 2 to 16 beats |
| Partition Range: | 2 to 77 partitions |
| Note Value Playback: | Quarter, 8th, 8th triplet, 16th, 16th triplet, 32nd, 32nd triplet |
| Rhythmic Range Possibility: | 2! = 2 to 12! = 479,001,600 different rhythms |

Figure 24:
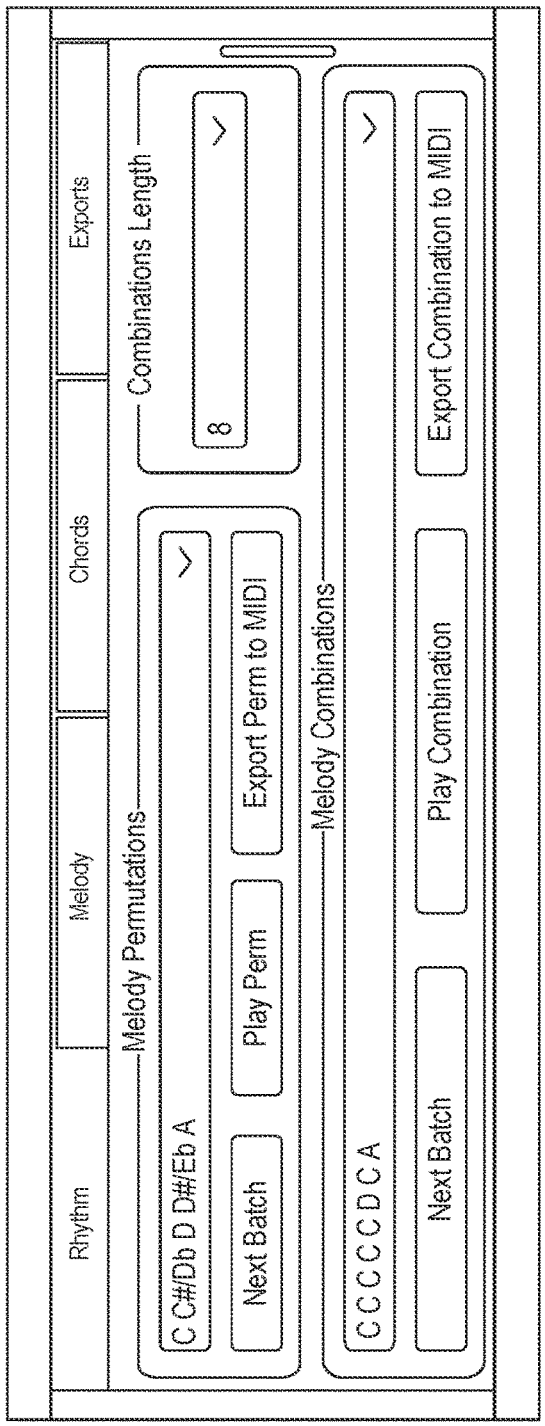
FIG. 24 is a screenshot illustrating an example interaction with some components of a user interface including melody permutations with A-G notation, according to some embodiments.

FIG. 24 is a screenshot illustrating an example interaction with some components of a user interface including melody permutations with A-G notation, according to some embodiments. In some embodiments, a user may be provided with the option to change how all the chords and melodies are displayed. A composer may display notes in letter notation (A-G), solmization (e.g., do, re, mi, etc.), roman numeral analysis, or integer notation (0-11), to name a few non-limiting examples.

FIG. 25 is a screenshot illustrating an example interaction with some components of a user interface including listings of favorite melodies and favorite chords in integer notation, according to some embodiments.

The chord progression tab may also generate up to every chord that may exist for a selected range of notes, pitches, octaves, or type of progression selected (e.g., perfect fifths, circle progressions, etc.). Once a chord is selected, a composer may try that chord against all the other chords. The composer may then combine, for example, two chord pairings to form a 4-chord progression, in some embodiments. From here a composer may calculate every permutation and combination possible for the chord progression. The composer may then take these chord progressions and assign a rhythm to it.

Figure 26:
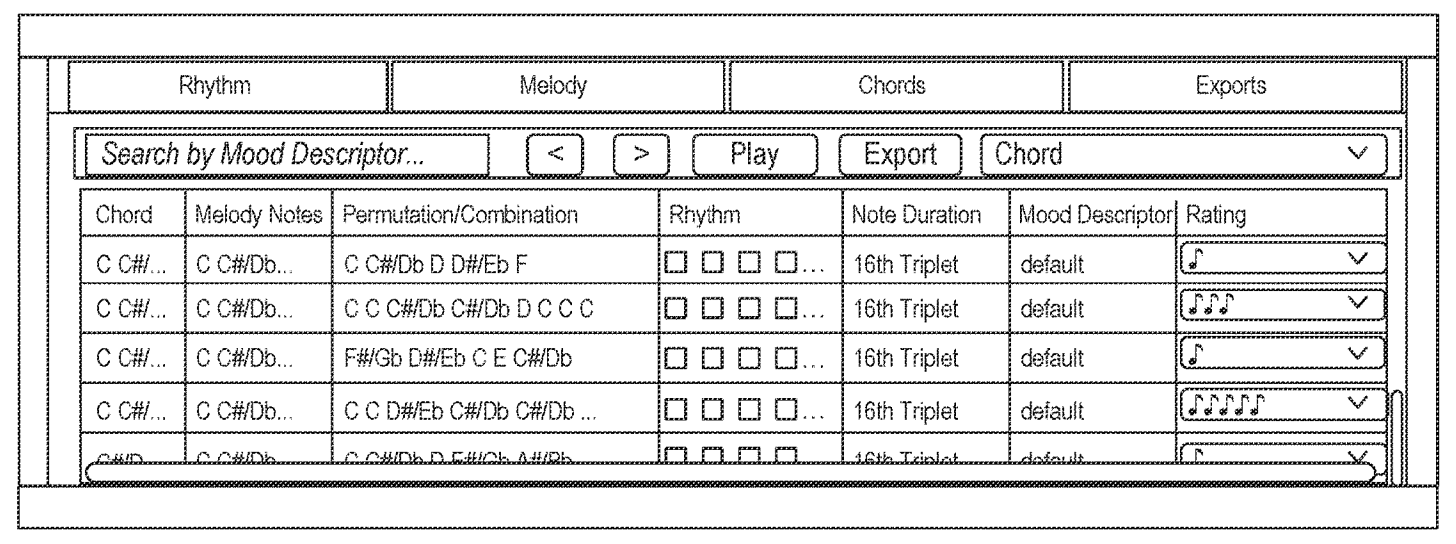

FIG. 26 is a screenshot illustrating an example interaction with some components of a user interface including melody elements and metadata, according to some embodiments.

Selecting a type from the top left drop-down may generates chords up to all possible chords of that type for a desired range and/or progression. These chords appear in the Chord Pairings I & II section shown in the Figure below. Selecting a type from the bottom left drop down may also generate all the possible chords of the selected type and/or from a selected range of notes, pitches, and/or octaves.

These chords may be paired against a single chord in the Chord Pairings I & II section. In some embodiments, other numbers of chords may be matched. This process may be repeated for the top right and bottom right drop-down menus. This process may be executed to create first and second chord pairings.

Figure 27:
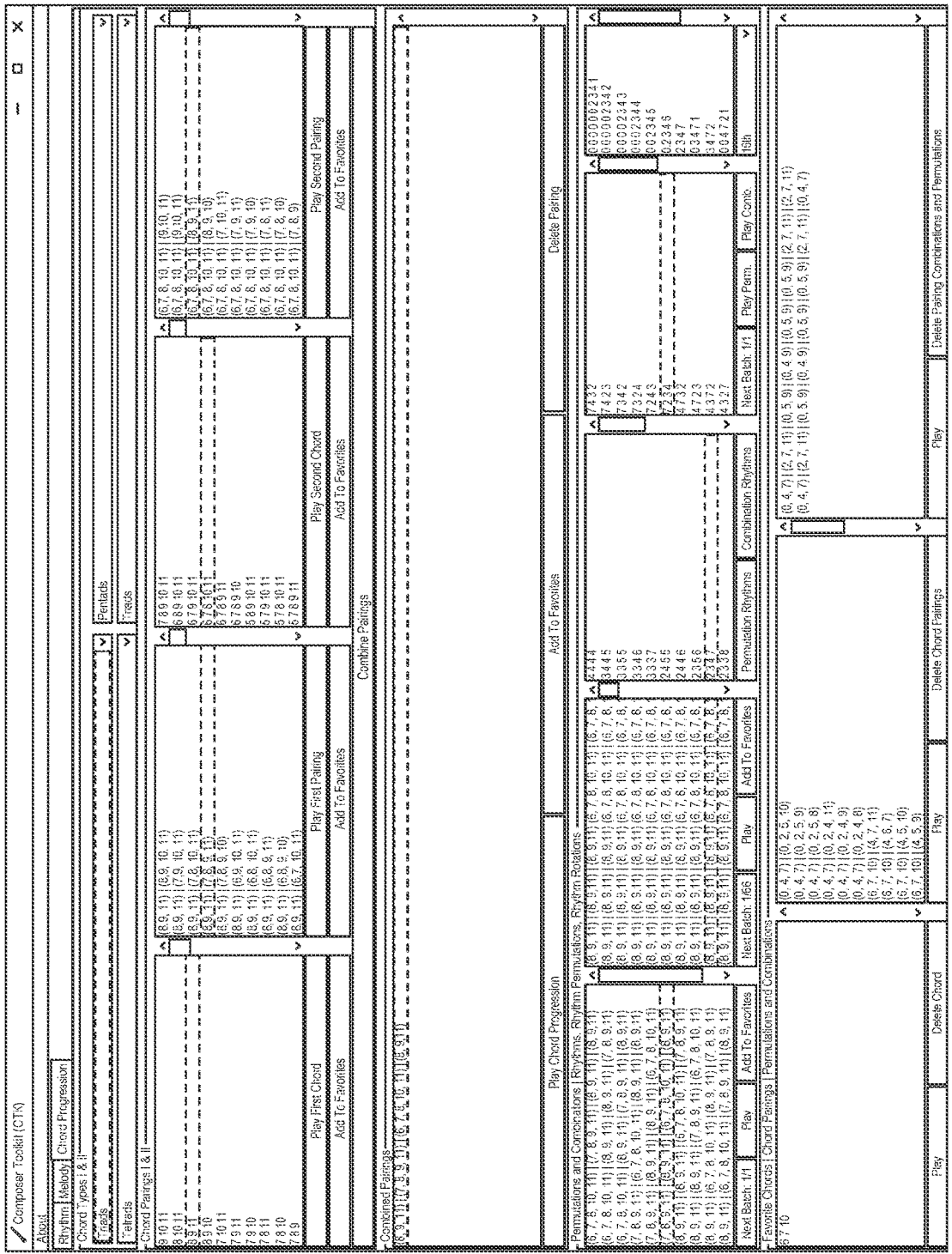
FIG. 27 is a screenshot illustrating an example interaction with some components of a user interface including a chord tab, according to some embodiments.

FIG. 27 is a screenshot illustrating an example interaction with some components of a user interface including a chord tab, according to some embodiments.

The chord progression tab may also generate up to every chord that may exist for a selected range of notes, pitches, octaves, or type of progression selected (e.g., perfect fifths, circle progressions, etc.). Once a chord is selected, a composer may try that chord against all the other chords.

The composer may then combine, for example, two chord pairings to form a 4-chord progression, in some embodiments. From here a composer may calculate every permutation and combination possible for the chord progression. The composer may then take these chord progressions and assign a rhythm to it.

Figure 28:
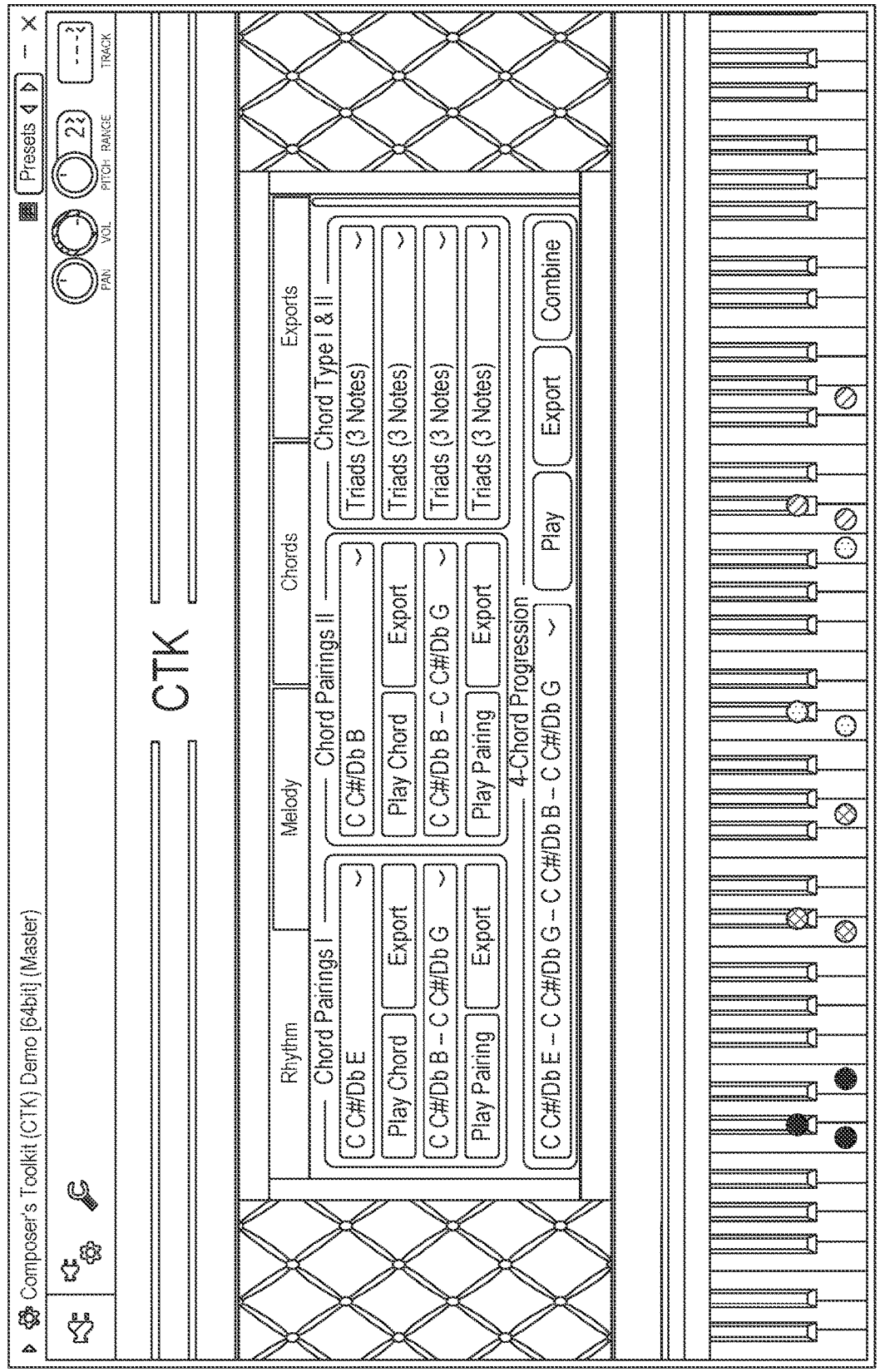
FIG. 28 is another screenshot illustrating an example interaction with some components of a user interface including a chord tab, according to some embodiments.

FIG. 28 is another screenshot illustrating an example interaction with some components of a user interface including a chord tab, according to some embodiments.

FIG. 29 is a screenshot illustrating an example interaction with some components of a user interface including chord-type dropdown menus, according to some embodiments.

Selecting a type from the top left drop-down may generates chords up to all possible chords of that type for a desired range and/or progression. These chords appear in the Chord Pairings I & II section shown in the Figure below. Selecting a type from the bottom left drop down may also generate all the possible chords of the selected type and/or from a selected range of notes, pitches, and/or octaves.

These chords may be paired against a single chord in the Chord Pairings I & II section. In some embodiments, other numbers of chords may be matched. This process may be repeated for the top right and bottom right drop-down menus. This process may be executed to create first and second chord pairings.

FIG. 30 is a screenshot illustrating an example interaction with some components of a user interface including selected listings of chord pairings in a progression, according to some embodiments.

Selecting a chord from the first list box may pair that chord against any or all other chord types of a composer's choice of chords and/or progressions. This process repeats for the second pairing. Once both pairings are chosen, a composer may combine these pairings into, in some embodiments, a 4-chord progression by clicking the Combine Pairings button. Its important to know that if a composer may want to update the second list box with a different chord type, then they may change the chord type in the drop down and then select the chord again in the first list box.

A composer may use the Play button to play a chord or a chord pairing at any time. The Add To Favorites button lets a composer add their favorite chord(s) or chord pairing(s) to the Favorites section.

Figure 31:
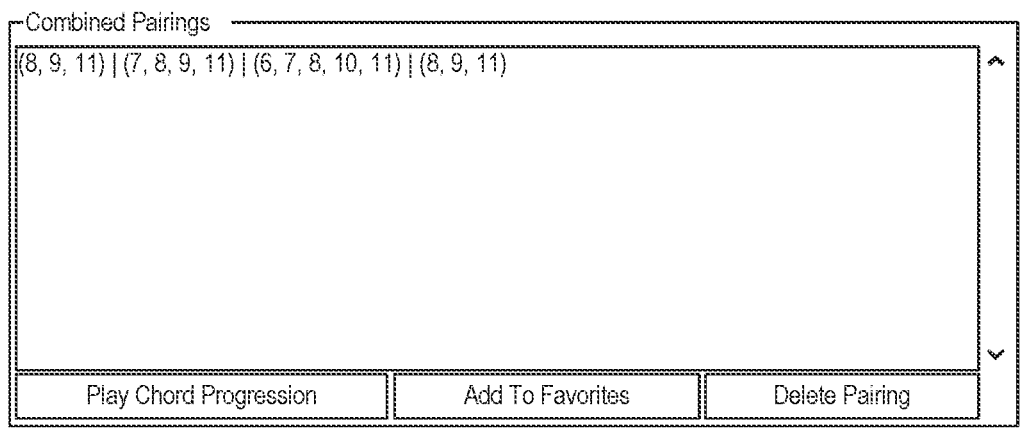
FIG. 31 is a screenshot illustrating an example interaction with some components of a user interface including a listing of combined chord pairings, according to some embodiments.

FIG. 31 is a screenshot illustrating an example interaction with some components of a user interface including a listing of combined chord pairings, according to some embodiments.

Once a composer has a combined pairing, a composer may use the Play button to hear the chord progression played back. A composer may also add a combined pairing to the Favorites section by clicking the Add To Favorites button. If the composer decides against using the combined pairing, the composer may delete it from the Combined Pairings list box by clicking the Delete Pairing button.

FIG. 32 is a screenshot illustrating an example interaction with some components of a user interface including listings of chord permutations and combinations, according to some embodiments.

Figure 33:
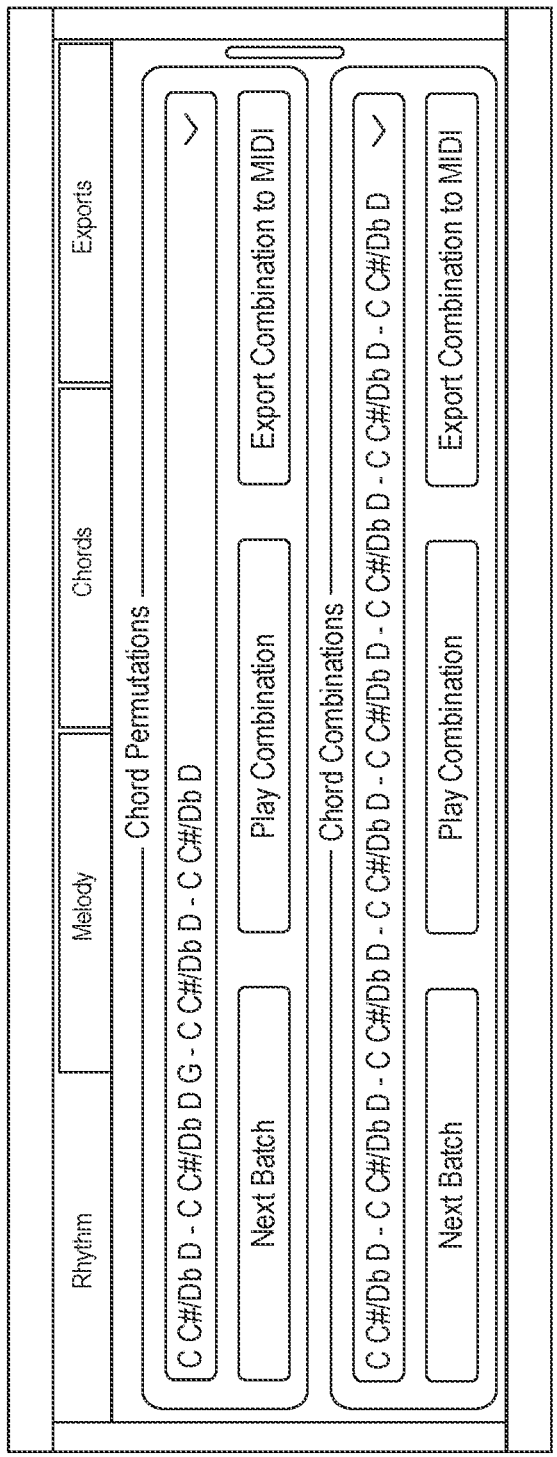
FIG. 33 is another screenshot illustrating an example interaction with some components of a user interface including listings of chord permutations and combinations, according to some embodiments.

In some embodiments, the list boxes as shown in FIG. 33 may be employed, in no particular order, to name a few non-limiting examples: Permutations, Combinations, Rhythms, Rhythmic Permutations, and Rhythmic Rotations. Any other order or elements or choices may be presented here.

This section may let a composer perform controlled experiments on finding the best chord and rhythm combination as well as showing possible ways to play a selected chord progression.

Once a combined chord is selected, a composer may use the Next Batch button to generate permutations and combinations on that chord.

be interpreted in terms of its note value. For example, selecting "16th" may cause the tool to interpret each beat as a 16th note.

The Add To Favorites button lets a composer add their favorite chord, chord pairing, and permutation and combination of the chord pairings to the Favorites section.

FIG. 33 is another screenshot illustrating an example interaction with some components of a user interface including listings of chord permutations and combinations, according to some embodiments.

Figure 34:
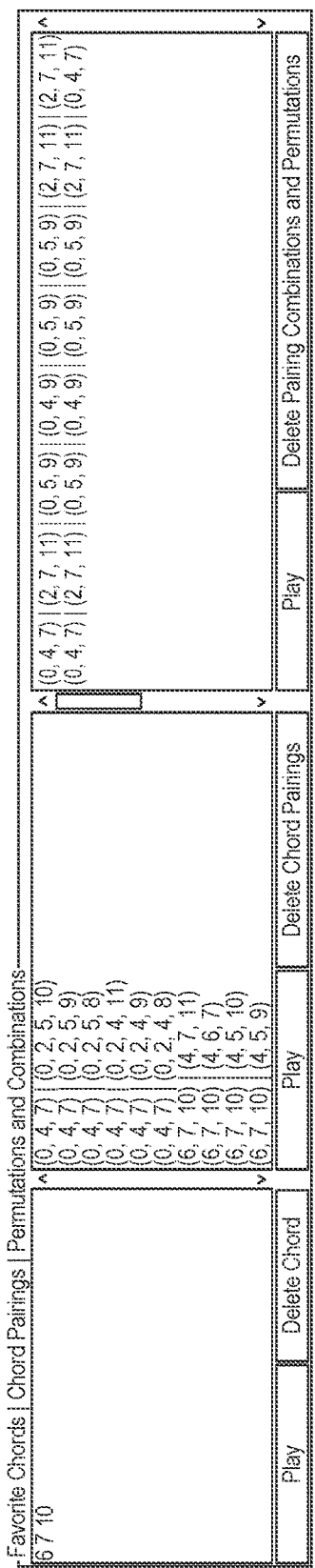
FIG. 34 is a screenshot illustrating an example interaction with some components of a user interface including a listing of favorite chords, pairings, permutations, and combinations, according to some embodiments.

FIG. 34 is a screenshot illustrating an example interaction with some components of a user interface including a listing of favorite chords, pairings, permutations, and combinations, according to some embodiments.

The Favorites list boxes may be used to store and/or display the composer's favorite chords, chord pairings, as well as permutations and combinations of chords. In some embodiments, such stored entries and/or listings may be deduplicated.

A composer may play their favorite chords or pairings by selecting a sequence from the Favorites section and hitting the Play button.

A composer may also delete any chord or chord pairing from the Favorites section.

Table 3 shows an non-limiting range of possibilities for one particular example configuration. For example, selecting an 8-note combinations length and combining four such chords may allow for over 65 thousand different chord pairings in some configurations. Allowing a composer to sort through these efficiently and select favorite rhythms as desired may present significant advantages for creativity and productivity.

TABLE 3

| | |
|---|---|
| Chord Types: | Diads (2 notes), Triads (3 notes), Tetrads (4 notes), Pentads (5 notes), Hexads (6 notes), Heptads (7 notes), Octads (8 notes), Nonads (9 notes), Decads (10 notes), Undecads (11 notes), Dodecads (12 notes) |
| Chords Range: (in a 12-note chromatic scale) | Diads (66), Triads (220), Tetrads (495), Pentads (792), Hexads (924), Heptads (792), Octads (495), Nonads (220), Decads (66), Undecads (12), Dodecads (1) Total = 4,083 different chords |
| Combinations Length Range: | 8 notes |
| Combined Pairings Range: | 4 chords |
| Combinations Range: | 4! = 24 possible chord arrangements |
| Permutations Range: (Number of chords (m) to the power of Combinations Length (c) = $(m^c)$) | $4^8$ = 65,536 different chord arrangements |
| Rhythm Length Range: | 16 beats |
| Partition Range: | 22 to 34 partitions |
| Note Value Playback: | Quarter, 8th, 8th triplet, 16th, 16th triplet, 32nd, 32nd triplet |
| Rhythmic Range Possibility: | 4! = 24 to 8! = 40,320 possible rhythms |

The Permutation Rhythms and Combination Rhythms buttons may generate rhythms that may be played with an arbitrary number (n) of chords in each progression.

Once a permutation or combination rhythm is generated, a composer may select a rhythm in the Rhythms list box and all the rotations/shifting may be performed on the rhythmic sequence. This may assist a composer in finding additional rhythmic variations.

The Play buttons may play all chord permutations, chord combinations, chord permutations with rhythm, and chord combinations with rhythm.

The drop-down under the Rhythm Rotations list box lets the composer select how they want the rhythmic sequence to FIG. 35 is a screenshot illustrating an example interaction with some components of a user interface including chord elements and metadata, according to some embodiments.

In some embodiments, metadata may be associated with any given element or rendering. Such metadata may include an indication of whether a given musical element of the output has been rendered, a rating, an element descriptor, a component descriptor, or a mood descriptor. These metadata may allow systematic review of output elements by a user for the first time considering the elements in a given composition project. Additionally, these metadata may also allow easy retrieval in the future, e.g., for favorite elements, highly-rated elements, elements that evoke a specific subjective mood or reaction in the user, etc. In some embodiments, metadata may include associations with other musical elements, for example.

Figure 36:
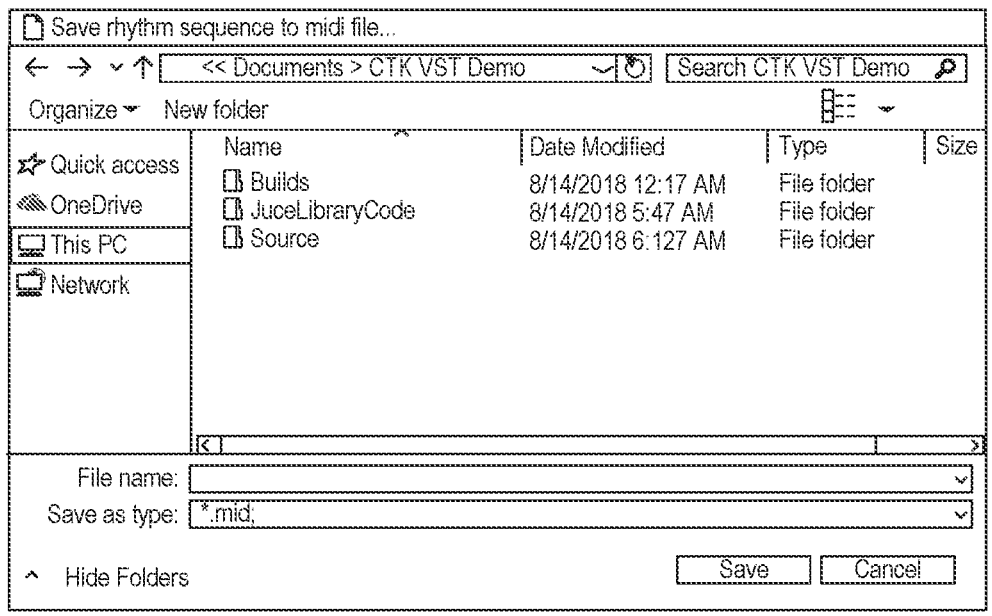
FIG. 36 is a screenshot illustrating an example interaction with some components of a user interface including an export feature, according to some embodiments.

FIG. 36 is a screenshot illustrating an example interaction with some components of a user interface including an export feature, according to some embodiments.

In embodiments where a composer may have to type the patterns into a DAW, mixer, synthesizer, or sequencer, for example, other time-saving measures may be helpful. To save time, CTK may be able to create a button to export rhythms, chords, melodies, and so on via MIDI.

The composer may then import the MIDI output from CTK into the DAW or sequencer, and may manually edit the MIDI notes or patterns along the way, such as for fine-tuning a final version or intermediate sequence, in some embodiments. Additionally, in some embodiments, multiple iterations of patterns generated by CTK may chained together after they are exported and/or edited. These sequences of CTK output, e.g., in the form of MIDI data, may be sent to a virtual instrument to achieve more realistic playback, for example.

In some embodiments, a user may be presented with options to export or save selected music elements in a variety of formats, such as standard MIDI files, other MIDI file formats, Virtual Studio Technology (VST), or other industry standards, which may facilitate work with a third-party DAW apparatus or software, for example.

For export or playback in CTK, MIDI octaves may be selectable, in some embodiments. By allowing the user to select a lower octave for MIDI playback, the melody tab may be used to create melodies in different tonal ranges, e.g., bass melodies, harmony, countermelodies, and other similar patterns, for example.

FIG. 37 is another screenshot illustrating an example interaction with some components of a user interface including an export feature, according to some embodiments.

Additionally, or alternatively, further embodiments may include MIDI out-routing to instruments, not only to MIDI files of various formats. Various MIDI instruments may be chosen and used to render generated musical elements at runtime without needing to export to a MIDI file, for example.

Figure 38:
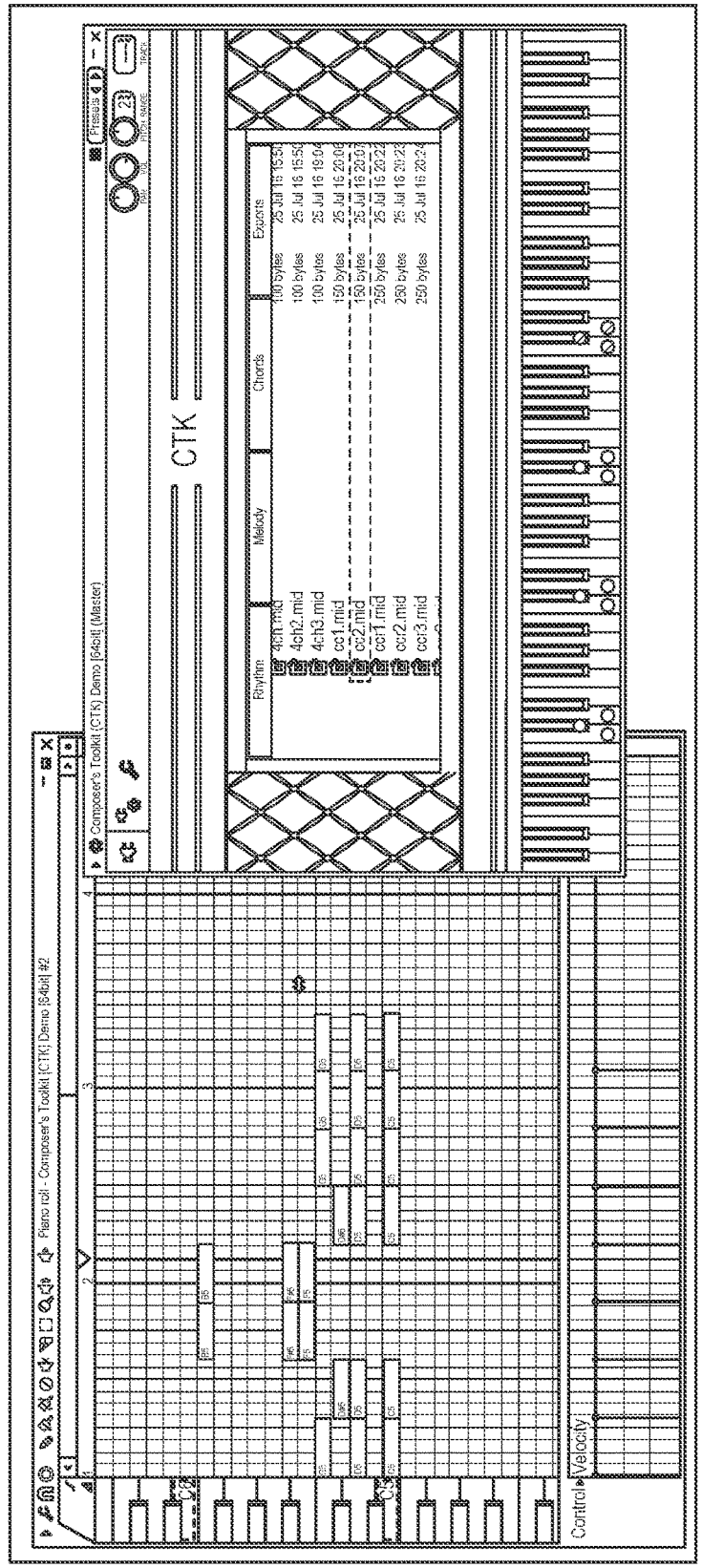
FIG. 38 is a screenshot illustrating an example interaction with some components of a user interface within an independent DAW program, according to some embodiments.

FIG. 38 is a screenshot illustrating an example interaction with some components of a user interface within an independent DAW program, according to some embodiments.

In some embodiments, 16 beats may be designated as a cap for the rhythm length to keep the musical elements lean. Generally, the higher the number of beats, the less "musical" a rhythm may become. Once some fundamental pieces are acquired, composers may combine them to form larger pieces of music. This same reasoning was applied when using 2-chord pairings and 4-chord combined pairings. Once a composer has the elements built, the composer may mix and match the elements in any way the composer may want.

A separate tab for arpeggios may be included in some embodiments. Arpeggios may be treated as broken-down chords, which may be further sequenced according to different permutations depending on the number of unique notes in each chord.

In addition to keyboard visualizations (see, e.g., FIGS. 2, 13, and 14), CTK, or an associated DAW, may be configured to show a piano-roll visualization, for further assistance with composition absent knowledge of notation or traditional music theory, for example. With support for these features and others, an example of a CTK-compatible DAW program includes FL Studio by Image-Line Software. In some embodiments, CTK may interface with or integrate with FL Studio, such as in the form of a plugin, script, file, library, or a combination thereof, for example. In some embodiments, CTK may be a standalone program. In further embodiments, CTK may be integrated in a standalone apparatus, such as dedicated DAW hardware, for example.

CTK may generate up to all the possible chord inversions in the melody tab. To do this, a composer may match up the chord type to the equal number of melody notes, select a chord in the Chords list box, select the chord again in the Melody Notes list box, then hit the Next Batch button under the Permutations list box. For example, for a triad (3 notes), a composer may select 3 in the Number of Melody Notes drop-down and select a chord.

CTK may further include any of the following features and enhancements, to name a few non-limiting examples:

In some embodiments, CTK may further include a lyrics tab (not shown) configured to calculate possible words and syllables that may fit within a binary rhythm sequence. For example, in the sequence 1 0 0 1 0 1 0, CTK may find words or syllables, such as in a specific dictionary, that may fit 100, 10, and 10 (3, 2, and 2, in decimal rhythm integer notation). The composer may be able to swap out each word until the perfect lyric combination is obtained. This tab may also contain a traditional dictionary, rhyming dictionary, and thesaurus for quick reference.

Rappers may benefit heavily from the lyrics tab, because vocals may double as rhythmic tools, in some genres of music including rap music. The lyrics tab may thus enable rappers to spot rhythms they like and associate words to those rhythms instantly.

A composer may be able to select one instrument and pair it against all other instruments. Arrangers and orchestrators may use this to discover every combination of instruments possible. This tab may also let the composer add new instruments to the list and repeat the pairing process.

In some embodiments, CTK may further include a voice-leading tab (not shown). In a case of a voice-leading tab, CTK may be configured to pass a chord progression and then automatically calculate a smooth voice when transitioning from chord to chord. This may have an option to avoid using block chords or other progressions that may sound jarring.

The advantages of CTK's enhanced techniques as described herein, and other advantages and benefits of implementing and using CTK, shall be apparent to persons of ordinary skill in the art. Among various uses, CTK may be used systematically and efficiently as a countermeasure against writer's block for a music composer (composer's block), as CTK may be configured to generate a variety of possible musical elements that a user may test. The enhanced techniques, as described herein, allow for a wide variety of elements generated by CTK and efficiently considered and evaluated by users, saving considerable time over traditional composition methods, even including modern DAW uses.

An added benefit of CTK's metadata as described above is that, with indications of which output elements have been rendered, considered, or evaluated (or conversely, which elements have not), users may cover many possibilities without retracing their steps. While existing tools to generate chords, for example, are limited only to simple rules of music theory and may provide no guidance for possibilities already considered, CTK may open a virtually limitless array of possible music elements, and may efficiently track how a user considers those possibilities, allowing the user to cover significantly more options in a similar span of time.

Even if conventional tools could theoretically generate all these possibilities, the results would be practically unusable for independent composers, not only due to enormous computing and storage requirements to process and store petabytes of data, in real time, but also for an individual user to consider and process the output efficiently. By contrast, using the enhanced techniques described herein, CTK may efficiently provide a composer with a window into a seemingly infinite musical world, a slice at a time.

CTK also may facilitate music education, reducing time needed to comprehend music theory, quickly enabling a wide array of specific types of musical element sets and subsets that can be generated quickly using iterator functions and rendered realistically, using nearly any virtual instrument sonification or visualization tools, in some embodiments. This facility lowers barriers to entry for potential users who may know nothing about music theory but who may be curious about music composition, for example. Even for experienced composers, CTK may not need to do all the work, but may spark the composer's own creativity enough to open new creative territory, genres, and unconventional sound patterns pleasing to human listeners, none of which could be easily automated. Additionally, musical elements, metadata, and any renderings, may be independently and selectively shared or otherwise exported or imported, allowing reuse in projects and other collaborative efforts with multiple composers, for example.

Various embodiments may be implemented, for example, using one or more well-known computer systems, such as computer system 3900 shown in FIG. 39. One or more computer systems 3900 may be used, for example, to implement any of the embodiments discussed herein, as well as combinations and sub-combinations thereof.

Computer system 3900 may include one or more processors (also called central processing units, or CPUs), such as a processor 3904. Processor 3904 may be connected to a bus or communication infrastructure 3906.

Computer system 3900 may also include user input/output device(s) 3903, such as monitors, keyboards, pointing devices, etc., which may communicate with communication infrastructure 3906 through user input/output interface(s) 3902.

One or more of processors 3904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., including mathematical or musical applications, for example.

Additionally, one or more of processors 3904 may include a coprocessor or other implementation of logic for accelerating calculations of generating musical elements or other specialized mathematical functions, including hardware-accelerated coprocessors. Such accelerated processors may further include instruction set(s) for acceleration using coprocessors and/or other logic to facilitate such acceleration.

Computer system 3900 may also include a main or primary memory 3908, such as random access memory (RAM). Main memory 3908 may include one or more levels of cache. Main memory 3908 may have stored therein control logic (i.e., computer software) and/or data.

Computer system 3900 may also include one or more secondary storage devices or secondary memory 3910. Secondary memory 3910 may include, for example, a main storage drive 3912 and/or a removable storage device or drive 3914. Main storage drive 3912 may be a hard disk drive or solid-state drive, for example. Removable storage drive 3914 may be a floppy disk drive, a magnetic tape drive, a compact disk drive, an optical storage device, tape backup device, and/or any other storage device/drive.

Removable storage drive 3914 may interact with a removable storage unit 3918. Removable storage unit 3918 may include a computer usable or readable storage device having stored thereon computer software (control logic) and/or data. Removable storage unit 3918 may be a floppy disk, magnetic tape, compact disk, DVD, optical storage disk, and/any other computer data storage device. Removable storage drive 3914 may read from and/or write to removable storage unit 3918.

Secondary memory 3910 may include other means, devices, components, instrumentalities or other approaches for allowing computer programs and/or other instructions and/or data to be accessed by computer system 3900. Such means, devices, components, instrumentalities or other approaches may include, for example, a removable storage unit 3922 and an interface 3920. Examples of the removable storage unit 3922 and the interface 3920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 3900 may further include a communication or network interface 3924. Communication interface 3924 may enable computer system 3900 to communicate and interact with any combination of external devices, external networks, external entities, etc. (individually and collectively referenced by reference number 3928). For example, communication interface 3924 may allow computer system 3900 to communicate with external or remote devices 3928 over communication path 3926, which may be wired and/or wireless (or a combination thereof), and which may include any combination of LANs, WANs, the Internet, etc. Control logic and/or data may be transmitted to and from computer system 3900 via communication path 3926.

Computer system 3900 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 3900 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, j Query, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 3900, main memory 3908, secondary memory 3910, and removable storage units 3918 and 3922, as well as tangible articles of manufacture embodying any combination of the foregoing. Such control logic, when executed by one or more data processing devices (such as computer system 3900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 39. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the present disclosure should not be limited by any of the above-described exemplary embodiments, but should be defined only in accordance with the following claims and their equivalents.

The invention claimed is:

1. A computer-implemented method, comprising:
   retrieving, by at least one computer processor, via a memory, a first constraint value;
   receiving, by the at least one computer processor, a selection of a set of musical elements;
   accepting, by the at least one computer processor, a second constraint value corresponding to the set of musical elements;

invoking, by the at least one computer processor, an iterator function, using at least the second constraint value as an argument;

generating, by the at least one computer processor, an output of the iterator function, wherein the output of the iterator function comprises at least part of a subset of the set of musical elements, wherein the subset is determined by the second constraint value;

limiting, by the at least one computer processor, a size of the output of the iterator function, according to the lesser of the first constraint value or a transform of the second constraint value, wherein the size of the output is less than or equal to the first constraint value;

rendering, by the at least one computer processor, the output of the iterator function.

2. A non-transitory computer-readable storage medium comprising instructions stored thereon that, when executed by at least one computer processor, cause the at least one computer processor to perform operations comprising:

retrieving, via a memory, a first constraint value;

receiving a selection of a set of musical elements;

accepting a second constraint value corresponding to the set of musical elements;

invoking an iterator function, using at least the second constraint value as an argument;

generating an output of the iterator function, wherein the output of the iterator function comprises at least part of a subset of the set of musical elements, wherein the subset is determined by the second constraint value;

limiting a size of the output of the iterator function, according to the lesser of the first constraint value or a transform of the second constraint value, wherein the size of the output is less than or equal to the first constraint value;

rendering the output of the iterator function.

3. A digital audio workstation (DAW), comprising:

a memory; and at least one computer processor configured to perform operations comprising:

retrieving, via the memory, a first constraint value;

receiving a selection of a set of musical elements;

accepting a second constraint value corresponding to the set of musical elements;

invoking an iterator function, using at least the second constraint value as an argument;

generating an output of the iterator function, wherein the output of the iterator function comprises at least part of a subset of the set of musical elements, wherein the subset is determined by the second constraint value;

limiting a size of the output of the iterator function, according to the lesser of the first constraint value or a transform of the second constraint value, wherein the size of the output is less than or equal to the first constraint value;

rendering the output of the iterator function.

* * * * *